US012559910B2

(12) United States Patent
Akita et al.

(10) Patent No.: US 12,559,910 B2
(45) Date of Patent: Feb. 24, 2026

(54) WORK MACHINE

(71) Applicant: Hitachi Construction Machinery Co., Ltd., Tokyo (JP)

(72) Inventors: Tarou Akita, Tsuchiura (JP); Yoshihiro Shirakawa, Tsukuba (JP); Kohei Ogura, Tsuchiura (JP); Mitsuhiko Kanehama, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 556 days.

(21) Appl. No.: 18/023,577

(22) PCT Filed: Nov. 11, 2021

(86) PCT No.: PCT/JP2021/041600
§ 371 (c)(1),
(2) Date: Feb. 27, 2023

(87) PCT Pub. No.: WO2022/137872
PCT Pub. Date: Jun. 30, 2022

(65) Prior Publication Data
US 2023/0304262 A1 Sep. 28, 2023

(30) Foreign Application Priority Data
Dec. 24, 2020 (JP) ................................ 2020-215521

(51) Int. Cl.
*E02F 9/22* (2006.01)
*F15B 11/16* (2006.01)
(Continued)

(52) U.S. Cl.
CPC .......... *E02F 9/2228* (2013.01); *E02F 9/2282* (2013.01); *E02F 9/2285* (2013.01);
(Continued)

(58) Field of Classification Search
CPC .. F15B 11/165; F15B 13/0422; F15B 20/007; F15B 21/045; F15B 21/087;
(Continued)

(56) References Cited

U.S. PATENT DOCUMENTS 5,970,709 A * 10/1999 Tohji .................... E02F 9/2292 60/429
9,051,712 B2 * 6/2015 Kodaka .................. E02F 3/962
(Continued)

FOREIGN PATENT DOCUMENTS

JP 2011-85198 A 4/2011
JP 2012-229777 A 11/2012
(Continued)

OTHER PUBLICATIONS

International Preliminary Report on Patentability (PCT/IB/338 & PCT/IB/373) issued in PCT Application No. PCT/JP2020/041600 dated Jul. 6, 2023, including English translation of document C2 (Japanese-language Written Opinion (PCT/ISA/237), filed on Feb. 27, 2023) (6 pages).
(Continued)

*Primary Examiner* — Michael Leslie
(74) *Attorney, Agent, or Firm* — Crowell & Moring LLP

(57) ABSTRACT

A work machine includes a flow control valve that controls a flow rate of a hydraulic fluid supplied to a hydraulic actuator, a center bypass line that introduces the hydraulic fluid from a pump through a center bypass passage section of the flow control valve into the tank, a bypass cutoff valve that controls an opening of the center bypass line, a solenoid proportional valve that generates a pilot pressure for controlling the bypass cutoff valve, a pilot valve that generates a pilot pressure for controlling the flow control valve on the basis of an amount of operation of an operation device, and a controller that controls the solenoid proportional valve on
(Continued)

the basis of the amount of operation. The controller controls the solenoid proportional valve to reduce an opening area of the bypass cutoff valve according to an increase in the amount of operation in a case the amount of operation is less than a predetermined amount of operation, and controls the solenoid proportional valve to make the opening area of the bypass cutoff valve larger than the minimum opening area in a case the amount of operation is a maximum amount of operation.

4 Claims, 15 Drawing Sheets

(51) Int. Cl.

| | |
|---|---|
| ***F15B 20/00*** | (2006.01) |
| *F15B 13/042* | (2006.01) |
| *F15B 13/043* | (2006.01) |
| *F15B 21/08* | (2006.01) |

(52) U.S. Cl.
CPC .......... *F15B 11/165* (2013.01); *F15B 20/007* (2013.01); *F15B 13/0422* (2013.01); *F15B 13/043* (2013.01); *F15B 21/087* (2013.01); *F15B 2211/3116* (2013.01); *F15B 2211/36* (2013.01); *F15B 2211/6343* (2013.01); *F15B 2211/6346* (2013.01)

(58) Field of Classification Search
CPC .......... F15B 2211/3116; F15B 2211/36; F15B 2211/6343; F15B 2211/6346; E02F 9/2228; E02F 9/2282
See application file for complete search history.

(56) References Cited

U.S. PATENT DOCUMENTS

| | | | | |
|---|---|---|---|---|
| 9,725,884 | B2 * | 8/2017 | Hashimoto | E02F 9/2242 |
| 10,072,396 | B2 * | 9/2018 | Yoshida | E02F 9/2267 |
| 10,184,499 | B2 * | 1/2019 | Joung | E02F 9/2282 |
| 11,085,173 | B2 * | 8/2021 | Kondo | E02F 9/2296 |
| 11,098,462 | B2 * | 8/2021 | Ogura | E02F 9/2203 |
| 2012/0198831 | A1 | 8/2012 | Kodaka et al. | |
| 2017/0130427 | A1 | 5/2017 | Metzger | |
| 2017/0276151 | A1 * | 9/2017 | Joung | F15B 11/10 |
| 2018/0238027 | A1 | 8/2018 | Kishida et al. | |
| 2021/0003150 | A1 | 1/2021 | Kondo et al. | |
| 2021/0348366 | A1 | 11/2021 | Ogura et al. | |

FOREIGN PATENT DOCUMENTS

| | | | |
|---|---|---|---|
| JP | 2017-57926 | A | 3/2017 |
| JP | 2019-148318 | A | 9/2019 |
| JP | 2020-153461 | A | 9/2020 |

OTHER PUBLICATIONS

International Search Report (PCT/ISA/210) issued in PCT Application No. PCT/JP2020/041600 dated Dec. 28, 2021 with English translation (four (4) pages).

Japanese-language Written Opinion (PCT/ISA/237) issued in PCT Application No. PCT/JP2020/041600 dated Dec. 28, 2021 (four (4) pages).

* cited by examiner

WORK MACHINE

TECHNICAL FIELD

The present invention relates to a work machine.

BACKGROUND ART

There are known work machines including a hydraulic pump, a hydraulic actuator driven by a hydraulic fluid delivered from the hydraulic pump, a control valve for controlling flow of the hydraulic fluid supplied from the hydraulic pump to the hydraulic actuator, and an operation device for operating the control valve (see Patent Document 1).

The work machine disclosed in Patent Document 1 has a hydraulic system including a center bypass cutoff valve provided downstream of the control valve that corresponds to a particular hydraulic cylinder in a center bypass line, and control means for controlling the center bypass cutoff valve to operate when operation means is operated to supply a hydraulic fluid to a load-bearing cylinder chamber of the particular hydraulic cylinder, for thereby making the discharged pressure from the hydraulic pump higher than the load pressure on the particular hydraulic cylinder.

Patent Document 2 discloses a lifting and lowering hydraulic circuit for directly drive controlling a boom cylinder to raise and lower a boom, the lifting and lowering hydraulic circuit having a bypass circuit as a fluid pressure impact prevention device that provides fluid communication between the bottom-side and rod-side chambers of a load cylinder through a solenoid on/off valve and a restriction valve. In the lifting and lowering hydraulic circuit disclosed in Patent Document 2, a controller transmits a command for opening the bypass circuit only for a predetermined period of time to the solenoid on/off valve when the cylinder starts or stops operating, resulting in a surge pressure.

PRIOR ART DOCUMENT

Patent Documents

Patent Document 1: JP-2011-85198-A
Patent Document 2: JP-2012-229777-A

SUMMARY OF THE INVENTION

Problems to be Solved by the Invention

The hydraulic system disclosed in Patent Document 1 is likely to produce a surge pressure due to a delay in the opening of the center bypass cutoff valve, compared with the returning operation of the control valve when an operation is performed to return the control valve corresponding to the particular hydraulic cylinder. The produced surge pressure leads to a reduction in work performing efficiency.

The technology disclosed in Patent Document 2 is aimed at preventing surge pressures from being generated. However, when the solenoid valve provided in the bypass circuit suffers a delay in its operation, compared with the operation of a hydraulic pilot three-position directional control valve, surge pressures may not be prevented from being generated.

It is an object of the present invention to prevent a surge pressure from being generated when a hydraulic actuator stops operating.

Means for Solving the Problems

A work machine according to an aspect of the present invention includes a pump that delivers a hydraulic fluid sucked from a tank, a hydraulic actuator that is driven by the hydraulic fluid delivered from the pump, a flow control valve having a center bypass passage section that introduces the hydraulic fluid from the pump into the tank when the flow control valve is in a neutral position and controlling a flow rate of the hydraulic fluid supplied to the hydraulic actuator according to an amount of displacement thereof from the neutral position, a center bypass line that introduces the hydraulic fluid supplied from the pump through the center bypass passage section of the flow control valve into the tank, a bypass cutoff valve that is provided downstream of the flow control valve in the center bypass line and that controls an opening of the center bypass line, a solenoid proportional valve that generates a pilot pressure for controlling the bypass cutoff valve, an operation device that operates the hydraulic actuator, a pilot valve that generates a pilot pressure for controlling the flow control valve on the basis of an amount of operation of the operation device, an amount-of-operation sensor that senses the amount of operation of the operation device, and a controller that controls the solenoid proportional valve on the basis of the amount of operation sensed by the amount-of-operation sensor, in which the controller controls the solenoid proportional valve to reduce an opening area of the bypass cutoff valve to a minimum opening area according to an increase in the amount of operation in a case the amount of operation sensed by the amount-of-operation sensor is in a range from a minimum amount of operation to less than a predetermined amount of operation, and the controller controls the solenoid proportional valve to make the opening area of the bypass cutoff valve larger than the minimum opening area in a case the amount of operation sensed by the amount-of-operation sensor is a maximum amount of operation.

Advantage of the Invention

According to the present invention, a surge pressure is prevented from being generated when the hydraulic actuator stops operating.

BRIEF DESCRIPTION OF THE DRAWINGS

FIG. 12 is a set of timing charts representing time-depending changes in an opening area of each valve and the pressure of the hydraulic fluid at the time an operation is performed to raise the boom of the hydraulic excavator according to the first embodiment, (a) illustrating timing charts when a temperature T of the hydraulic fluid is equal to or higher than a threshold value TO, and (b) illustrating timing charts when the temperature T of the hydraulic fluid is less than the threshold value TO.

MODES FOR CARRYING OUT THE INVENTION

Work machines according to embodiments of the present invention will be described below with reference to the drawings. According to the embodiments, work machines illustrated as crawler-type hydraulic excavators will be described by way of example. Work machines perform kinds of work including earth-moving work, construction work, demolishing work, dredging work, and the like.

First Embodiment

Figure 1:
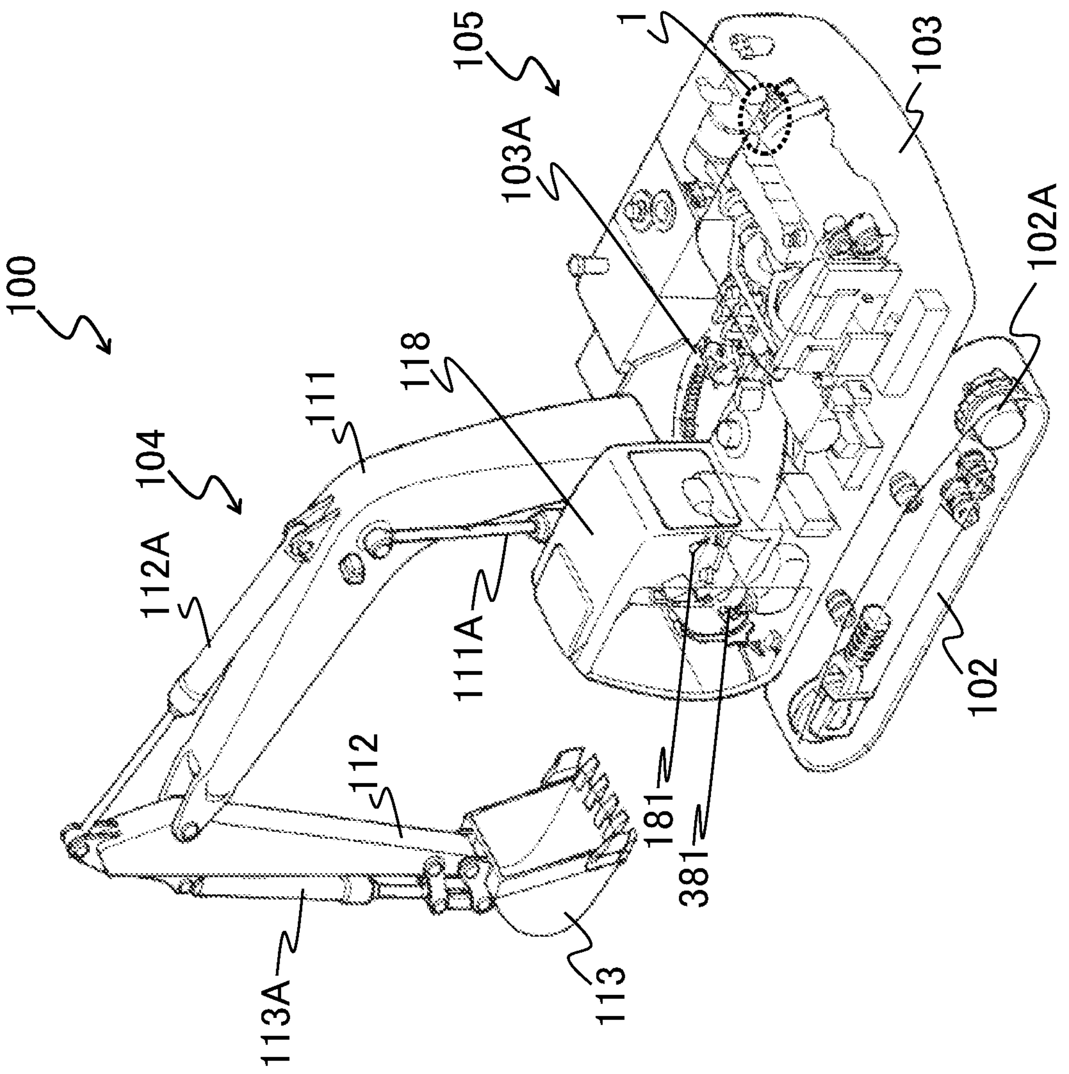
FIG. 1 is a side view of a hydraulic excavator according to a first embodiment of the present invention.

FIG. 1 is a side view of a hydraulic excavator 100 according to a first embodiment of the present invention. As illustrated in FIG. 1, the hydraulic excavator 100 includes a machine body 105 and a work implement 104 mounted on the machine body 105. The machine body 105 has a crawler-type track structure 102 and a swing structure 103 swingably provided on the track structure 102. The track structure 102 travels by driving a pair of left and right drawlers with respective track motors 102A. The swing structure 103 is coupled to the track structure 102 by a swing device having a swing motor 103A. The swing structure 103 is driven by the swing motor 103A to turn (swing) with respect to the track structure 102.

The swing structure 103 includes a cabin 118 to be occupied by the operator and an engine room housing therein an engine and hydraulic devices including hydraulic pumps and the like, driven by the engine. The engine is a power source of the hydraulic excavator 100 and includes, for example, an internal combustion engine such as a diesel engine.

The work implement 104 includes a multiple-joint work implement mounted on the swing structure 103 and has a plurality of hydraulic actuators and a plurality of driven members (front members) driven by the plurality of hydraulic actuators. Specifically, the work implement 104 comprises three driven members (a boom 111, an arm 112, and a bucket 113) coupled in series with each other. The boom 111 has a proximal end portion angularly movably coupled to a front portion of the swing structure 103 by a boom pin. The arm 112 has a proximal end portion angularly movably coupled to a distal end portion of the boom 111 by an arm pin. The bucket 113 is angularly movably coupled to a distal end portion of the arm 112 by a bucket pin.

The boom 111 is turnably driven by a boom cylinder 111A as a hydraulic actuator (hydraulic cylinder) when it is extended or contracted. The arm 112 is turnably driven by an arm cylinder 112A as a hydraulic actuator (hydraulic cylinder) when it is extended or contracted. The bucket 113 is turnably driven by a bucket cylinder 113A as a hydraulic actuator (hydraulic cylinder) when it is extended or contracted.

Figure 2:
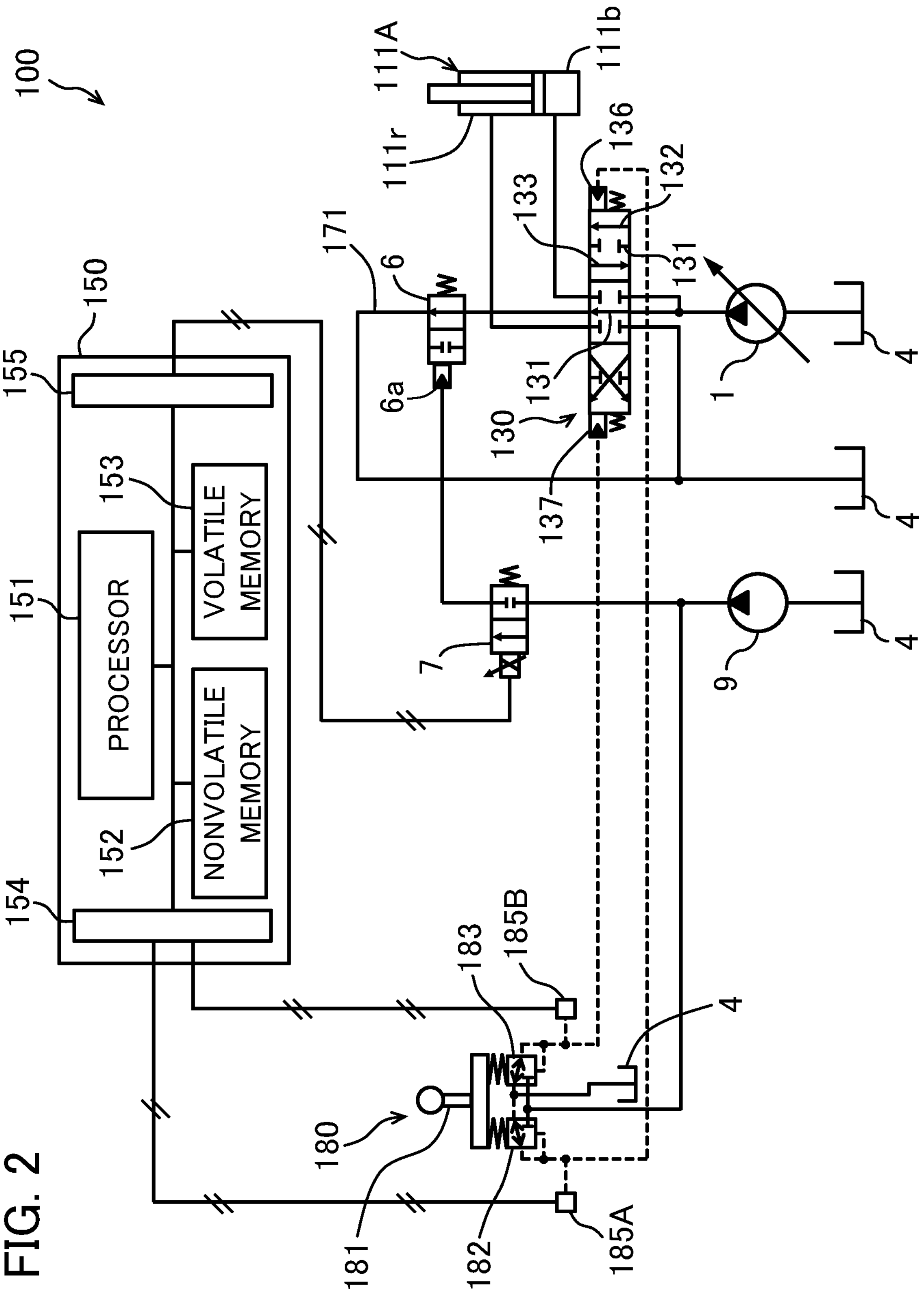
FIG. 2 is a diagram of a hydraulic system (hydraulic drive circuit) incorporated in the hydraulic excavator according to the first embodiment.

FIG. 2 is a diagram of a hydraulic system (hydraulic drive circuit) incorporated in the hydraulic excavator 100 according to the first embodiment. Note that, in FIG. 2, only parts that are involved in driving the boom cylinder 111A are illustrated, and parts that are involved in driving the other hydraulic actuators are omitted, for simplicity of illustration.

As illustrated in FIG. 2, the hydraulic system includes a tank 4 for storing a hydraulic fluid serving as an operating fluid therein, a main pump 1 and a pilot pump 9 that are driven by the engine (not shown) for discharging the hydraulic fluid drawn from the tank 4, the boom cylinder 111A driven by the hydraulic fluid discharged from the main pump 1, a center bypass line 171 interconnecting the main pump 1 and the tank 4, a flow control valve 130 provided to the center bypass line 171, a bypass cutoff valve 6 provided to the center bypass line 171 downstream of the flow control valve 130, a solenoid proportional valve 7 for generating a pilot pressure that controls the bypass cutoff valve 6, an operation device 180 for operating the boom cylinder 111A, a controller 150 for controlling various components of the hydraulic excavator 100 as a controlling device, and pressure sensors 185A and 185B for sensing pilot pressures acting on respective pilot bearing members 136 and 137 of the flow control valve 130. The center bypass line 171 is a hydraulic line for guiding the hydraulic fluid supplied from the main pump 1 via a center bypass passage section 131 of the flow control valve 130 to the tank 4.

The main pump 1 is a variable-displacement hydraulic pump whose displacement is variable, and the pilot pump 9 is a fixed-variable hydraulic pump whose displacement is fixed. Note that the main pump 1 may alternatively be a fixed-variable hydraulic pump.

The flow control valve (directional control valve) 130 controls the direction of flow and flow rate of the hydraulic fluid supplied from the main pump 1 to the boom cylinder 111A. When a tank pressure acts on the pilot bearing members 136 and 137, the flow control valve 130 is in a neutral position. The flow control valve 130 is an open-center control valve and includes the center bypass passage section 131 that introduces the hydraulic fluid supplied from the main pump 1 through the center bypass line 171 into the tank 4 in the neutral position, a meter-in passage section 132 for guiding the hydraulic fluid supplied from the main pump 1 to the boom cylinder 111A, and a meter-out passage section 133 for guiding the hydraulic fluid (returning fluid) supplied from the boom cylinder 111A to the tank 4.

The flow control valve 130 controls the rate of the hydraulic fluid supplied to the boom cylinder 111A according to the displacement (spool stroke) of the flow control valve 130 from the neutral position. The larger the displacement of the flow control valve 130 from the neutral position becomes, the higher the speed at which the boom cylinder 111A operates becomes. Also, when the flow control valve 130 is moved in one direction from the neutral position, the boom cylinder 111A is extended. When the flow control valve 130 is moved in the opposite direction from the neutral position, the boom cylinder 111A is contracted. In other words, the flow control valve 130 controls the direction in which and the speed at which the boom cylinder 111A is driven.

The operation device 180 is an operation device for operating the boom 111 (the boom cylinder 111A and the flow control valve 130) and has an operation lever 181 as an operation member and a boom raising pilot valve 182 and a boom lowering pilot valve 183 for generating pilot pressures (hereinafter also referred to as operation pressures) for controlling the flow control valve 130. The operation device 180 is a hydraulic-pilot-type operation device for directly supplying the flow control valve 130 with pilot pressures (operation pressures) generated by the pilot valves 182 and 183 according to the direction in which and the degree to which the operation lever 181 is operated. The operation lever 181 is provided on the right side of an operator's seat in the cabin (see FIG. 1), for example, and can be operated selectively forwardly and rearwardly. When the operation lever 181 is operated rearwardly, the boom 111 is moved in a raising direction. When the operation lever 181 is operated forwardly, the boom 111 is moved in a lowering direction.

The boom raising pilot valve 182 reduces a primary pilot pressure supplied from the pilot pump 9 to generate a pilot pressure (an operation pressure) according to the amount of operation (lever stroke) of the operation lever 181 in a boom raising direction. The operation pressure supplied from the boom raising pilot valve 182 is applied through a pilot line to the pilot bearing member 136 (on the right-hand end as shown) of the flow control valve 130, driving the flow control valve 130 to the left in FIG. 2. The hydraulic fluid discharged from the main pump 1 is now supplied through the meter-in passage section 132 of the flow control valve 130 to a bottom-side fluid chamber 111*b* of the boom cylinder 111A, and the hydraulic fluid from a rod-side fluid chamber 111*r* of the boom cylinder 111A is discharged through the meter-out passage section 133 of the flow control valve 130 to the tank 4. As a result, the boom cylinder 111A is extended.

The boom lowering pilot valve 183 reduces the primary pilot pressure supplied from the pilot pump 9 to generate a pilot pressure (operation pressure) according to the amount of operation (lever stroke) of the operation lever 181 in a boom lowering direction. The operation pressure supplied from the boom lowering pilot valve 183 is applied through a pilot line to the pilot bearing member 137 (on the left-hand end as shown) of the flow control valve 130, driving the flow control valve 130 to the rightward direction in FIG. 2. The hydraulic fluid discharged from the main pump 1 is now supplied through a meter-in passage section of the flow control valve 130 to the rod-side fluid chamber 111*r* of the boom cylinder 111A, and the hydraulic fluid from the bottom-side fluid chamber 111*b* of the boom cylinder 111A is discharged through a meter-out passage section of the flow control valve 130 to the tank 4. As a result, the boom cylinder 111A is contracted.

Figure 3:
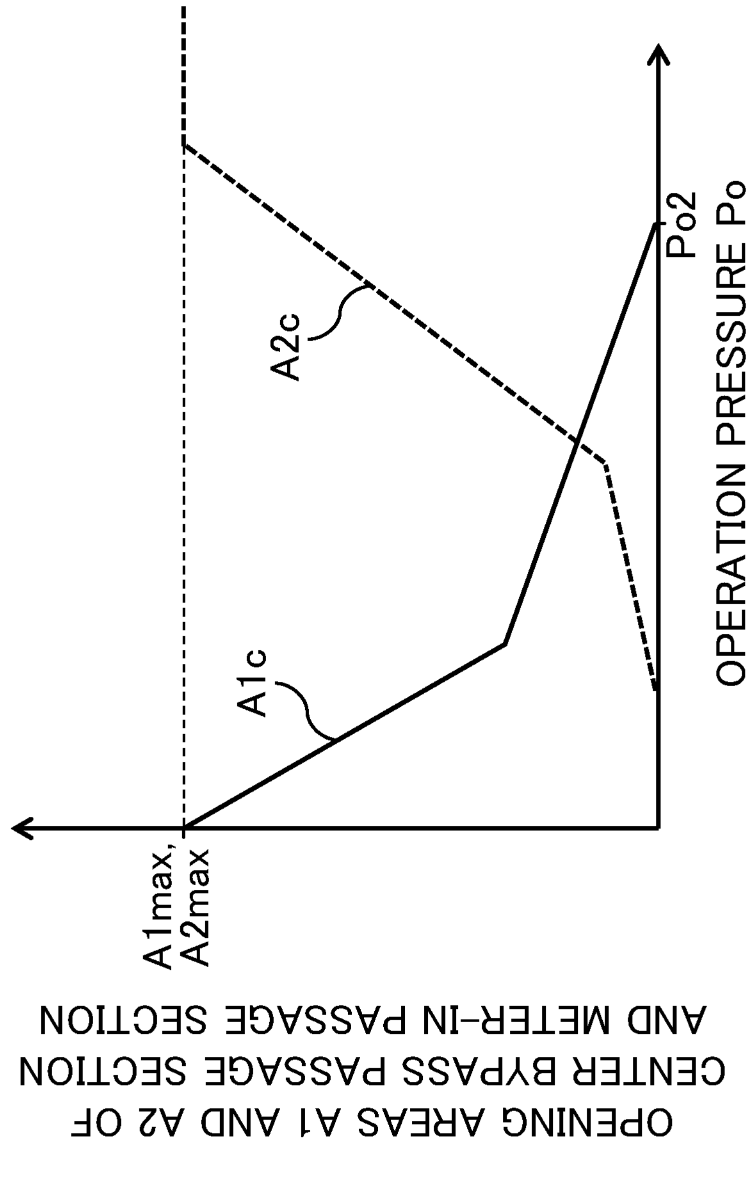
FIG. 3 is a diagram representing opening characteristics of a center bypass passage section and a meter-in passage section of a flow control valve.

FIG. 3 is a diagram representing opening characteristics A1*c* of the center bypass passage section 131 and opening characteristics A2*c* of the meter-in passage section 132 of the flow control valve 130. In FIG. 3, the horizontal axis represents an operation pressure Po acting on the pilot bearing member 136 (a pilot pressure generated by the pilot valve 182) and the vertical axis represents an opening area A1 of the center bypass passage section 131 and an opening area A2 of the meter-in passage section 132. The operation pressure Po generally corresponds to the stroke of the flow control valve 130. Note that the pressure on the pilot bearing member 137 is a minimum pressure (tank pressure).

As illustrated in FIG. 3, when the flow control valve 130 is in the neutral position, i.e., when the operation pressure Po acting on the pilot bearing member 136 is the minimum pressure (tank pressure), the opening area A1 of the center bypass passage section 131 is a maximum opening area A1max, and the meter-in passage section 132 is fully closed (i.e., the opening area A2 thereof is 0).

As the operation pressure Po acting on the pilot bearing member 136 increases, the stroke of the flow control valve 130 increases. The higher the operation pressure Po acting on the pilot bearing member 136 becomes, the larger the opening area A2 of the meter-in passage section 132 becomes, and the smaller the opening area A1 of the center bypass passage section A1 becomes. When the operation pressure Po becomes equal to or higher than a second operation pressure Po2 to be described later, the center bypass passage section 131 is fully closed (i.e., the opening area A1 thereof becomes 0). When the operation pressure Po becomes equal to or higher than a predetermined pressure higher than the second operation pressure Po2, the opening area A2 of the meter-in passage section 132 reaches a maximum opening area A2max (A2max=A1max). As described above, changes in the opening area A1 of the center bypass passage section 131 in response to the operation pressure Po are in inverse relation to changes in the opening area A2 of the meter-in passage section 132 in response to the operation pressure Po. Note that, although not illustrated, the opening characteristics of the meter-out passage sections 133 are generally the same as the opening characteristics A2*c* of the meter-in passage sections 132.

As illustrated in FIG. 2, the bypass cutoff valve 6 is a hydraulic-pilot-type control valve capable of controlling the opening of the center bypass line 171. The bypass cutoff valve 6 has a pilot bearing member 6*a* that bears a pilot pressure (secondary pressure) generated by the solenoid proportional valve 7, and is controlled by the pilot pressure acting on the pilot bearing member 6*a*.

The solenoid proportional valve 7 is provided to a pilot line interconnecting the pilot pump 9 driven by the engine (not shown) and the pilot bearing member 6*a* of the bypass cutoff valve 6. The solenoid proportional valve 7 reduces the pilot primary pressure supplied from the pilot pump 9 to generate a pilot pressure according to a control current from the controller 150. The solenoid proportional valve 7 is a pressure reducing valve in which the degree of pressure reduction decreases as the control current applied thereto increases. Therefore, when the control current applied to the solenoid proportional valve 7 increases, a secondary pressure (pilot pressure) generated thereby increases according to the control current.

Figure 4:
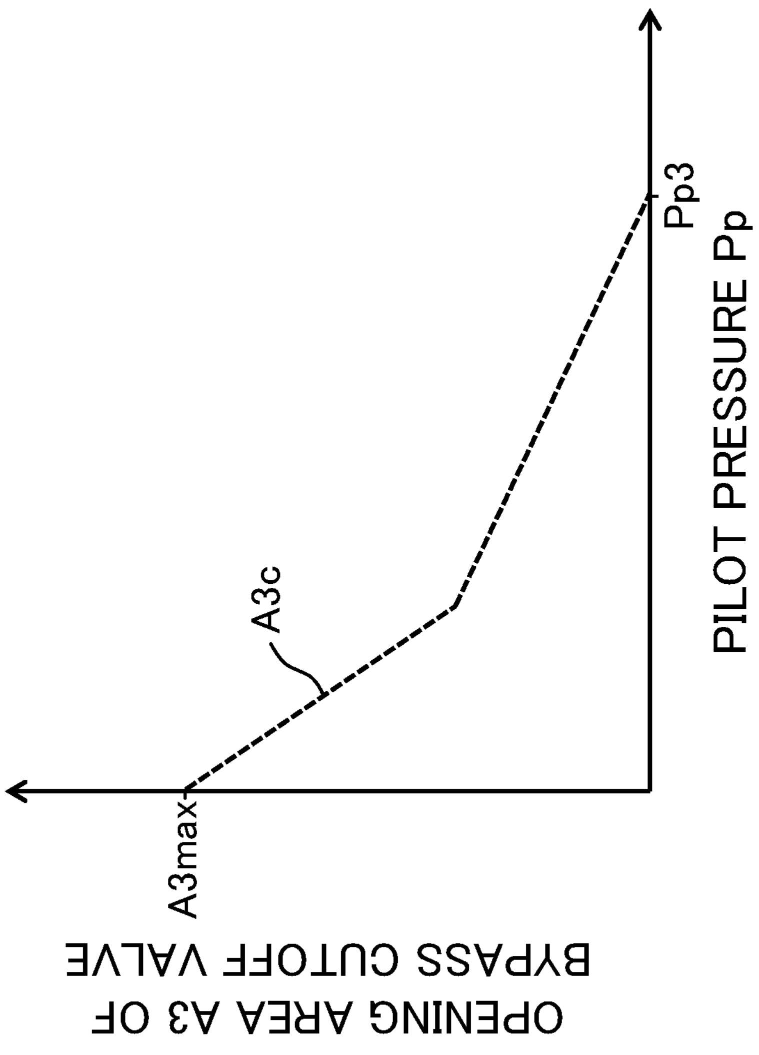
FIG. 4 is a diagram representing opening characteristics of a bypass cutoff valve.

FIG. 4 is a diagram representing opening characteristics A3*c* of the bypass cutoff valve 6. In FIG. 4, the horizontal axis represents the pilot pressure acting on the pilot bearing member 6*a* (the pilot pressure generated by the solenoid proportional valve 7) and the vertical axis represents the opening area A3 of the bypass cutoff valve 6. As illustrated in FIG. 4, when the pilot pressure acting on the pilot bearing member 6*a* is a minimum pressure (tank pressure), the bypass cutoff valve 6 is kept in a fully open position by the force of a spring. When the pilot pressure acting on the pilot bearing member 6*a* becomes equal to or higher than a predetermined pressure Pp3, the bypass cutoff valve 6 is shifted to a cutoff position. When the bypass cutoff valve 6 is in the cutoff position, the center bypass line 171 is closed (the opening area A3 thereof becomes 0). As the pilot pressure Pp acting on the pilot bearing member 6*a* increases, the opening area A3 of the bypass cutoff valve 6 decreases. Note that, according to the first embodiment, as described later, while the hydraulic excavator 100 is in operation, the opening area A3 of the bypass cutoff valve 6 is controlled in a range from a minimum opening area A3 min (A3 min>0) to a maximum opening area A3max according to the magnitude of the operation pressure Po (see FIG. 6).

As illustrated in FIG. 2, the pressure sensor 185A senses the operation pressure Po supplied from the boom raising pilot valve 182 when a boom raising operation is carried out by the operation lever 181 and outputs the sensed pressure to the controller 150. The pressure sensor 185B senses the operation pressure Po supplied from the boom lowering pilot valve 183 when a boom lowering operation is carried out by the operation lever 181 and outputs the sensed pressure to the controller 150. The operation pressure Po sensed by the pressure sensors 185A and 185B is correlated (proportional) to the amount of operation of the operation lever 181. Therefore, the pressure sensors 185A and 185B have a function as an amount-of-operation sensor for sensing the amount of operation of the operation device 180.

The controller 150 controls the solenoid proportional valve 7 on the basis of the operation pressure Po sensed by the pressure sensors 185A and 185B (corresponding to the amount of operation of the operation device 180). The controller 150 includes a computer including a processor 151 such as a CPU (Central Processing Unit), an MPU (Micro Processing Unit), or a DSP (Digital Signal Processor, a nonvolatile memory 152 such as a ROM (Read Only Memory), a flash memory, or a hard disk drive, a volatile memory 153 generally called a RAM (Random Access Memory), an input interface 154, an output interface 155, and other peripheral circuits. Note that the controller 150 may comprise a single computer or a plurality of computers.

The nonvolatile memory 152 stores programs for performing various computations. In other words, the nonvolatile memory 152 is a storage medium capable of reading programs for realizing the functions according to the present embodiment. The processor 151 is a processing device for loading the programs stored in the nonvolatile memory 152 into the volatile memory 153 and performing computations. The processor 151 performs predetermined computations on signals fetched from the input interface 154, the nonvolatile memory 152, and the volatile memory 153 according to the programs.

The input interface 154 converts input signals into data that can be processed by the processor 151. Also, the output interface 155 generates output signals according to the result of computations carried out by the processor 151, and outputs the generated output signals to devices including the solenoid proportional valve 7, and the like.

Figure 5:
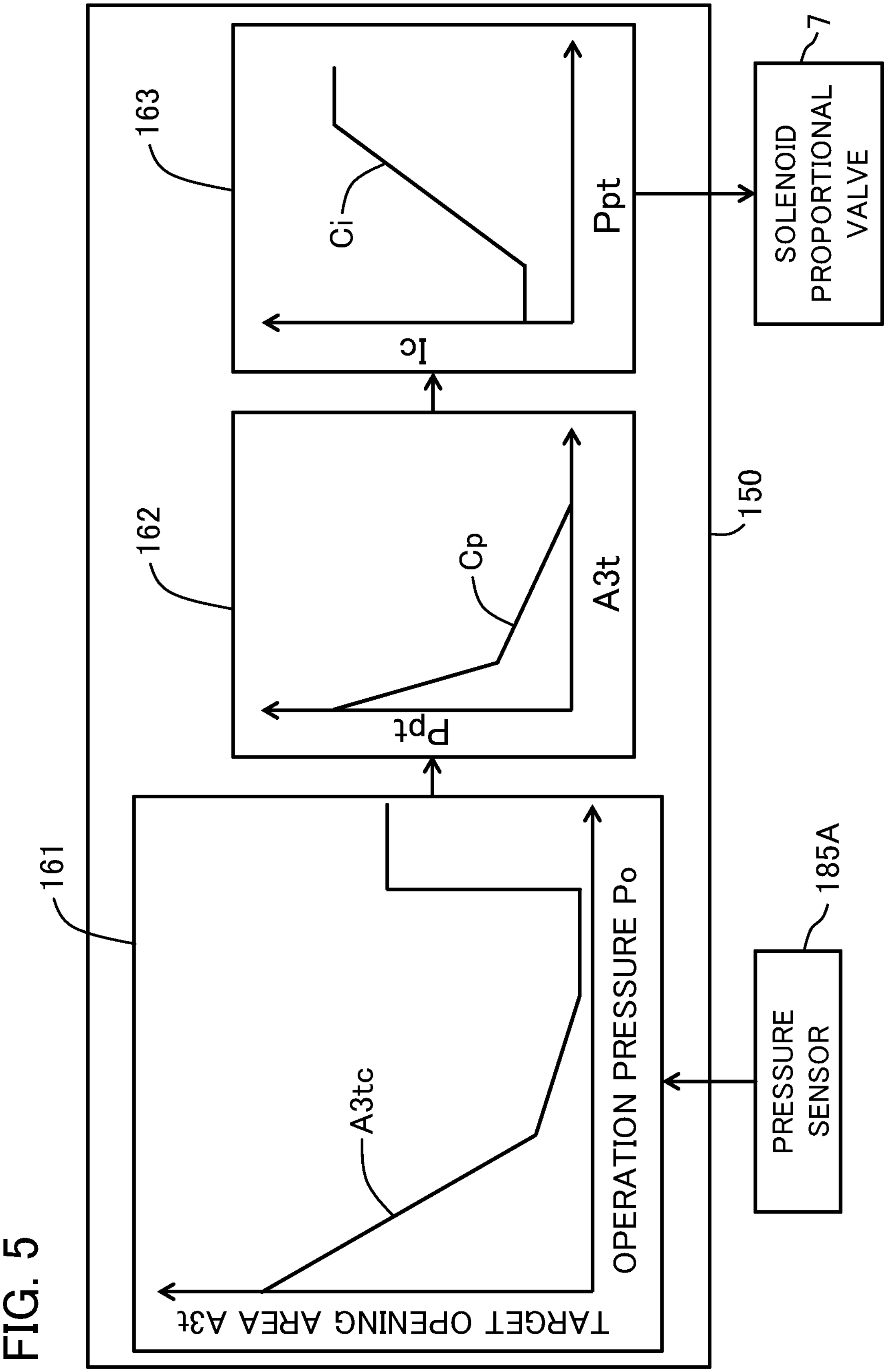
FIG. 5 is a block diagram representing a process of computing a control current value for a solenoid proportional valve, carried out by a controller of the hydraulic excavator according to the first embodiment.

FIG. 5 is a block diagram representing a process of computing a control current value for the solenoid proportional valve 7, carried out by the controller 150 of the hydraulic excavator 100 according to the first embodiment. FIG. 5 illustrates a computing process to be carried out when a boom raising operation is performed. As illustrated in FIG. 5, the controller 150 has an opening area computing section 161, a pilot pressure computing section 162, and a current computing section 163. The opening area computing section 161, the pilot pressure computing section 162, and the current computing section 163 have their functions fulfilled when the programs stored in the nonvolatile memory 152 are executed by the processor 151.

The opening area computing section 161 refers to target opening characteristics A3*tc* stored in advance in the nonvolatile memory 152 and computes a target opening area A3*t* as a target value for the opening area A3 of the bypass cutoff valve 6 on the basis of the operation pressure Po sensed by the pressure sensor 185A.

Figure 6:
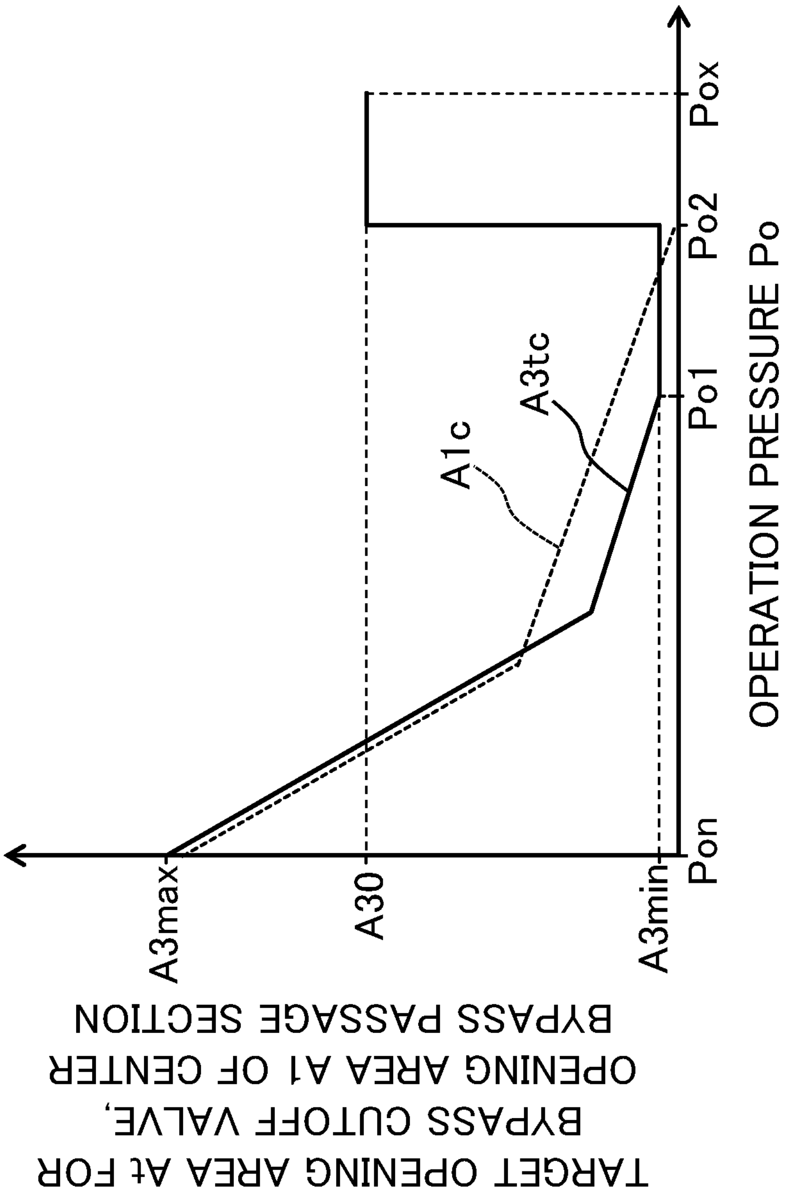
FIG. 6 is a diagram representing target opening characteristics of the bypass cutoff valve.

FIG. 6 is a diagram representing the target opening characteristics A3*tc* of the bypass cutoff valve 6. Note that FIG. 6 also illustrates opening characteristics A1*c* of the center bypass passage section 131 of the flow control valve 130 as a broken-line curve. As illustrated in FIG. 6, the target opening characteristics A3*tc* are representative of characteristics of the target opening area A3*t* for the bypass cutoff valve 6 in response to the operation pressure Po acting on the pilot bearing member 136, and are stored in a table format in the nonvolatile memory 152.

The relation between the operation pressure Po and the target opening area A3*t* according to the target opening characteristics A3*tc* is as follows: When the operation pressure Po is in a range from a minimum pressure (hereinafter also referred to as a minimum operation pressure) Pon to less than the second operation pressure Po2, the target opening area A3*t* for the bypass cutoff valve 6 decreases until it reaches the minimum opening area A3 min as the operation pressure Po increases. Specifically, when the operation pressure Po is the minimum operation pressure Pon (that is, when the operation lever 181 is in a neutral position and the amount of operation thereof is 0), the target opening area A3*t* is the maximum opening area A3max. When the operation pressure Po is in a range from the minimum operation pressure Pon to a first operation pressure Po1, the target opening area A3*t* for the bypass cutoff valve 6 continuously decreases as the operation pressure Po increases. When the operation pressure Po is the first operation pressure Po1, the target opening area A3*t* for the bypass cutoff valve 6 reaches the minimum opening area A3 min. In addition, when the operation pressure Po is in a range from the first operation pressure Po1 to less than the second operation pressure Po2, the target opening area A3*t* for the bypass cutoff valve 6 remains to be the minimum opening area A3 min.

As the operation pressure Po increases to the second operation pressure Po2, the target opening area A3*t* for the bypass cutoff valve 6 rises from the minimum opening area A3 min to a predetermined opening area A30. According to the first embodiment, when the operation pressure Po is in a range from the second operation pressure Po2 to a maximum operation pressure Pox, the target opening area A3*t* for the bypass cutoff valve 6 remains to be the predetermined opening area A30. The predetermined opening area A30 is of a value larger than the minimum opening area A3 min and equal to or smaller than the maximum opening area A3max.

As illustrated in FIG. 5, the pilot pressure computing section 162 refers to target pilot pressure characteristics Cp stored in advance in the nonvolatile memory 152 and computes a target pilot pressure Ppt as a target value for the pilot pressure Pp generated by the solenoid proportional valve 7 on the basis of the target opening area A3*t* computed by the opening area computing section 161. The target pilot pressure characteristics Cp are characteristics indicating that the target pilot pressure Ppt decreases as the target opening area A3*t* increases, and are stored in a table format in the nonvolatile memory 152.

The current computing section 163 refers to control current characteristics Ci stored in advance in the nonvolatile memory 152, computes a control current value Ic to be supplied to the solenoid of the solenoid proportional valve 7 on the basis of the target pilot pressure Ppt computed by the pilot pressure computing section 162, and outputs a control current according to the computed control current to the solenoid proportional valve 7. The control current characteristics Ci are characteristics indicating that the control current value Ic increases as the target pilot pressure Ppt increases.

Major operation of the first embodiment will be described below. A crane work (load suspending work) carried out by the hydraulic excavator 100 will be described below by way of example. In the crane work, the hydraulic excavator 100 suspends a load with a wire joined to the load and engaging a hook provided on the back of the bucket 113 of the hydraulic excavator 100. Also, in the crane work, the boom 111 is raised and lowered to move the load upwardly and downwardly. When the boom 111 is raised, the bottom-side fluid chamber 111*b* of the boom cylinder 111A acts as a load holding side.

When the operator operates the operation lever 181 in the boom raising direction, the boom cylinder 111A is extended to turn the boom 111 upwardly. Thereafter, when the operator operates the operation lever 181 back to the neutral position, the boom cylinder 111A is decelerated to a stop.

According to the first embodiment, in the region where the operation pressure Po ranges from the minimum operation pressure Pon to the second operation pressure Po2 at which the center bypass passage section 131 of the flow control valve 130 is fully closed, the opening area of the center bypass line 171 is represented by a composite opening area (effective area) provided by the opening area of the flow control valve 130 and the opening area of the bypass cutoff valve 6. The composite opening area is smaller than the opening area A1 of the center bypass passage section 131.

In this manner, it is possible to reduce the flow rate of the hydraulic fluid returning from the center bypass line 171 to the tank 4 while maintaining the pressure of the hydraulic fluid discharged from the main pump 1 at a level required to operate the boom cylinder 111A. As a result, the energy loss can be reduced for improved fuel economy. Moreover, satisfactory fine operability can be achieved.

The controller 150 according to the first embodiment controls the solenoid proportional valve 7 to cause the opening area A3 of the bypass cutoff valve 6 to reach the predetermined opening area A30 larger than the minimum opening area A3min when the operation pressure Po sensed by the pressure sensor 185A is the maximum operation pressure Pox.

This makes it possible to decelerate the boom cylinder 111A smoothly to a stop without causing shocks when the operator returns the operation lever 181 back to the neutral position after having operated the operation lever 181 to a maximum in the boom raising direction. According to the configuration of the first embodiment, the ability of the configuration to be able to stop the boom cylinder 111A without causing shocks when the operation lever 181 is returned will be described below in comparison with a comparative example of the first embodiment.

Figure 7:
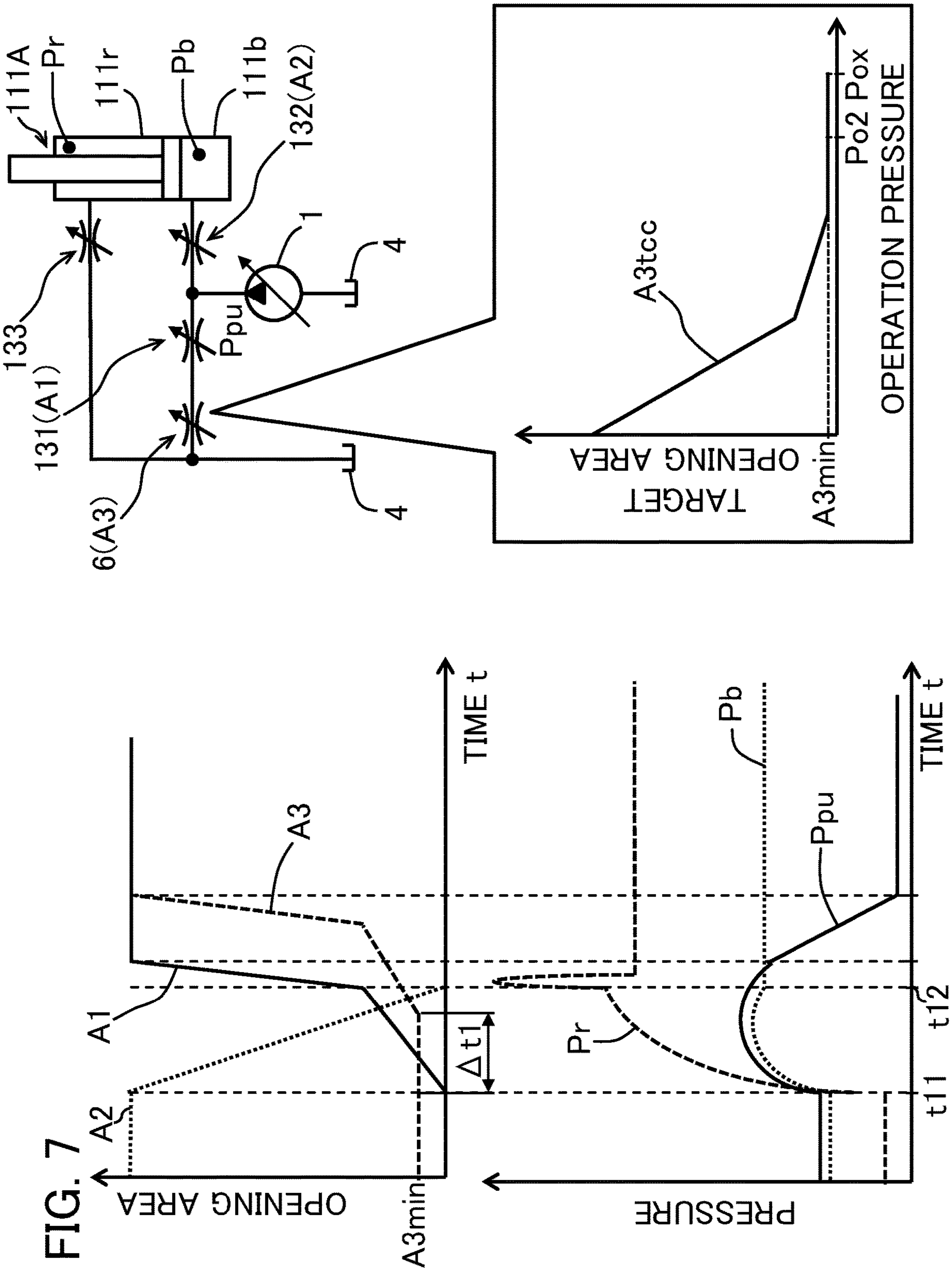
FIG. 7 is a set of timing charts representing time-depending changes in an opening area of each valve and a pressure of a hydraulic fluid at a time at which an operation is performed to return a boom of a hydraulic excavator according to a comparative example of the first embodiment.
Figure 8:
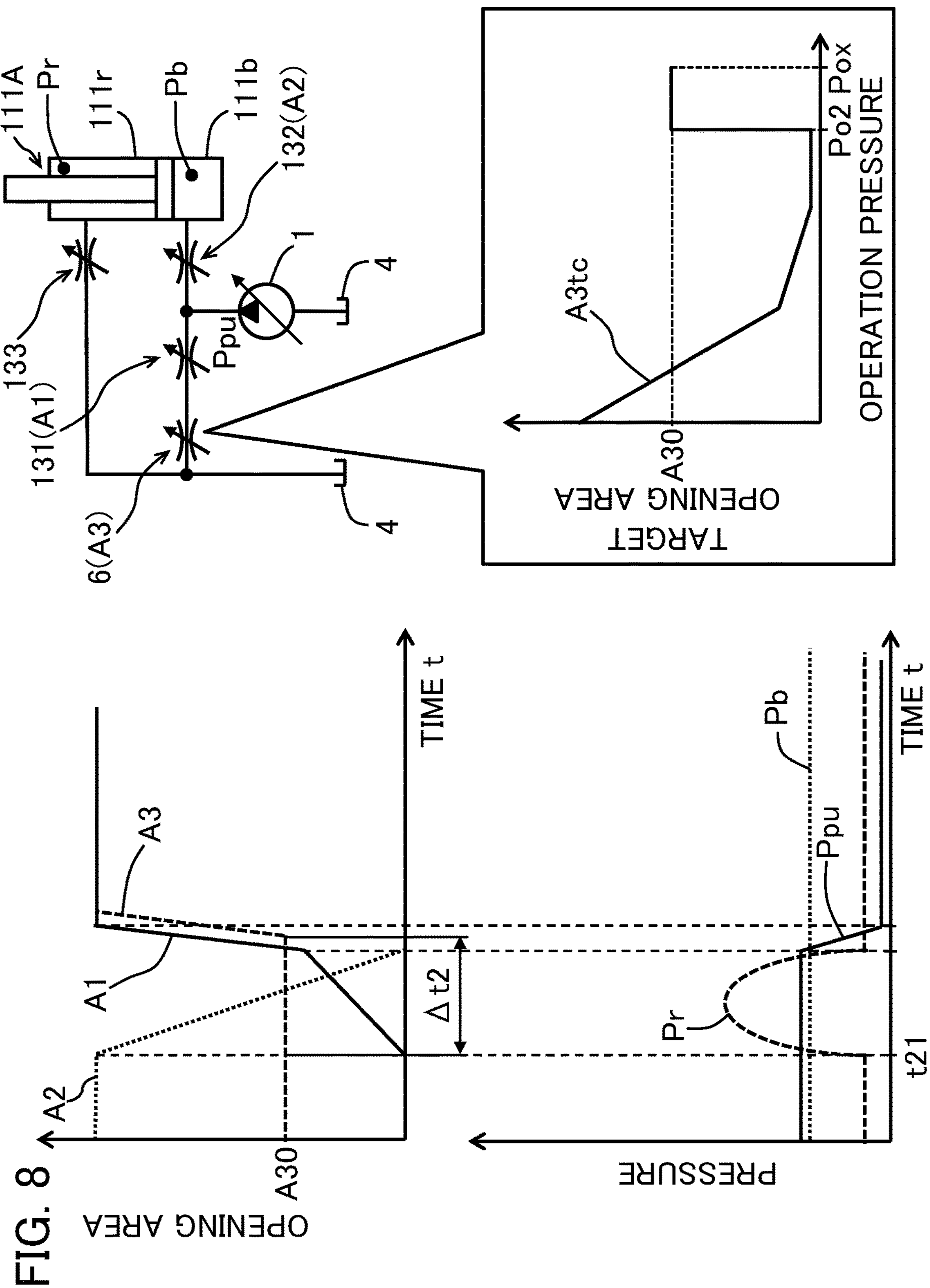
FIG. 8 is a set of timing charts representing time-depending changes in an opening area of each valve and a pressure of a hydraulic fluid at a time at which an operation is performed to return a boom of the hydraulic excavator according to the first embodiment.

FIG. 7 is a set of timing charts representing time-depending changes in the opening area of each valve and the pressure of a hydraulic fluid at a time at which an operation is performed to return the boom of the hydraulic excavator according to the comparative example of the first embodiment. FIG. 8 is a set of timing charts representing time-depending changes in the opening area of each valve and the pressure of a hydraulic fluid at a time at which an operation is performed to return the boom of the hydraulic excavator according to the first embodiment. The timing charts illustrated in FIGS. 7 and 8 are plotted when the operator returns the operation lever 181 back to the neutral position after having operated the operation lever 181 to a maximum in the boom raising direction. Note that the upper timing charts representing the changes in the opening area illustrate the time-dependent changes in the opening area A1 of the center bypass passage section 131 of the flow control valve 130, the opening area A2 of the meter-in passage section 132, and the opening area A3 of the bypass cutoff valve 6. In addition, the lower timing charts representing the changes in the pressure illustrate the time-dependent changes in the discharged pressure (also referred to as pump pressure) Ppu of the main pump 1, the pressure (also referred to as bottom pressure) Pb of the hydraulic fluid in the bottom-side fluid chamber 111*b* of the boom cylinder 111A, and the pressure (also referred to as rod pressure) Pr of the hydraulic fluid in the rod-side fluid chamber 111*r* of the boom cylinder 111A.

FIGS. 7 and 8 also illustrate, along with the timing charts, simplified hydraulic circuits and target opening characteristics of the bypass cutoff valve 6 for assisting in explaining the timing charts. As illustrated in FIG. 7, the hydraulic excavator according to the comparative example of the first embodiment is similar in configuration to the hydraulic excavator 100 according to the first embodiment. However, target opening characteristics A3tcc stored in the nonvolatile memory 152 are different from the target opening characteristics A3*tc* according to the first embodiment. Specifically, the target opening characteristics A3tcc according to the comparative example are characteristics indicating that a target opening area At is the minimum opening area A3 min when the operation pressure Po is in a range of equal to or larger than the second operation pressure Po2 and equal to or less than the maximum operation pressure Pox.

As illustrated in FIG. 7, with the hydraulic excavator according to the comparative example of the first embodiment, when the operator starts to return the operation lever 181 after having operated the operation lever 181 to the maximum in the boom raising direction (at point t11 of time), the flow control valve 130 starts to return to the neutral position. Then, from point t11 of time, the opening area A2 of the meter-in passage section 132 decreases, and the opening area A1 of the center bypass passage section 131 increases.

The bypass cutoff valve 6 starts to open with a delay time Δt1 from point t11 of time when the center bypass passage section 131 of the flow control valve 130 starts to open. In this manner, reasons that there is a response difference between the flow control valve 130 and the bypass cutoff valve 6 will be described below. The flow control valve 130 starts to return due to a reduction in the pilot pressure (operation pressure) output from the pilot valve 182 upon the operation to return the operation lever 181.

By contrast, the bypass cutoff valve 6 starts to return due to a reduction in the pilot pressure output from the solenoid proportional valve 7. The solenoid proportional valve 7 is controlled by the control current output from the controller 150. The controller 150 outputs the control current according to the operation pressure Po to the solenoid proportional valve 7 after having sensed a reduction in the operation pressure Po sensed by the pressure sensor 185A.

As described above, the bypass cutoff valve 6 is controlled in operation by the controller 150. Therefore, the period of time required for the controller 150 to perform communication and computation after having acquired the sensed operation pressure Po until it outputs the control current to the solenoid proportional valve 7 is enumerated as one of the causes of the response delay. In addition, the period of time after the control current has been input to the solenoid proportional valve 7 until the pilot pressure acting on the pilot bearing member 6*a* of the bypass cutoff valve 6 varies is also enumerated as another one of the causes of the response delay. By contrast, the flow control valve 130 is not controlled by the controller 150, but controlled directly by the operation pressure output from the operation device 180 operated by the operator. Consequently, the bypass cutoff valve 6 lags in operation behind the flow control valve 130.

Because the bypass cutoff valve 6 lags in operation behind the flow control valve 130, even when the opening area A1 of the center bypass passage section 131 of the flow control valve 130 has increased, since the bypass cutoff valve 6 remains closed, the pump pressure Ppu increases. When the pump pressure Ppu increases, the bottom pressure Pb as the pressure of the hydraulic fluid in the bottom-side fluid chamber 111*b* of the boom cylinder 111A that is connected to the main pump 1 through the meter-in passage section 132 also goes higher. When the bottom pressure Pb rises, the braking force (the rod pressure Pr×the pressure bearing area of the rod-side fluid chamber 111*r*—the bottom pressure Pb×the pressure bearing area of the bottom-side fluid chamber 111*b*) for decelerating the boom cylinder 111A becomes weaker. According to the comparative example, therefore, the meter-in passage section 132 and the meter-out passage section 133 are closed while the boom cylinder 111A is moving fast, producing a surge pressure in the rod-side fluid chamber 111*r* (at point t12 of time).

When the surge pressure is generated at the time of stopping the boom cylinder 111A, the work implement 104 tends to suffer impacts and vibrations, which makes it difficult to position the work implement 104. In addition, when the work implement 104 suffers impacts and vibrations, the operator is liable to experience increased fatigue. Consequently, the surge pressure thus produced is likely to invite a reduction in the work performing efficiency of the hydraulic excavator 100.

In contrast, according to the first embodiment, as described above, the controller 150 controls the solenoid proportional valve 7 such that the opening area A3 of the bypass cutoff valve 6 reaches the predetermined opening area A30 when the operation pressure becomes equal to or higher than the second operation pressure Po2. Thus, according to the first embodiment, as illustrated in FIG. 8, while the operator is operating the operation lever 181 to the maximum in the boom raising direction, the opening area A3 of the bypass cutoff valve 6 remains to be the predetermined opening area A30.

When the operator then operates the operation lever 181 to return (at point t21 of time), since the bypass cutoff valve 6 has already been open, the hydraulic fluid discharged from the main pump 1 can be relieved into the tank 4. The pump pressure Ppu and the bottom pressure Pb can thus be prevented from rising. As the braking force is appropriately applied to the boom cylinder 111A, the boom cylinder 111A is smoothly decelerated to a stop.

According to the first embodiment, a delay time Δt2 thus occurs from point t21 of time when the flow control valve 130 starts to return until the bypass cutoff valve 6 starts to open (until the opening area A3 of the bypass cutoff valve 6 starts to increase). However, a surge pressure can be prevented from being generated in the rod-side fluid chamber 111*r* by opening the bypass cutoff valve 6. According to the first embodiment, in other words, since the work implement 104 can be prevented from suffering impacts and vibrations, the work implement 104 can easily be positioned. According to the first embodiment, moreover, since the work implement 104 can be prevented from suffering impacts and vibrations, the operator can experience reduced fatigue. As a consequence, the work performing efficiency of the hydraulic excavator 100 can be increased.

The above embodiment offers the following advantages:

(1) The hydraulic excavator (work machine) 100 has the main pump (pump) 1 for discharging the hydraulic fluid sucked from the tank 4, the boom cylinder (hydraulic actuator) 111A driven by the hydraulic fluid discharged from the main pump 1, and the center bypass passage section 131 for guiding the hydraulic fluid from the main pump 1 to the tank 4 when in the neutral position. The hydraulic excavator 100 also includes the flow control valve 130 for controlling the flow rate of the hydraulic fluid supplied to the boom cylinder 111A according to the amount of displacement from the neutral position, the center bypass line 171 for guiding the hydraulic fluid supplied from the main pump 1 via the center bypass passage section 131 of the fluid control valve 130 to the tank 4, the bypass cutoff valve 6 provided downstream of the flow control valve 130 in the center bypass line 171, for controlling the opening of the center bypass line 171, the solenoid proportional valve 7 for generating the pilot pressure for controlling the bypass cutoff valve 6, the operation device 180 for operating the boom cylinder 111A, the pilot valve 182 for generating the operation pressure (pilot pressure) for controlling the flow control valve 130 on the basis of the amount of operation of the operation device 180, the pressure sensor (amount-of-operation sensor) 185A for sensing the operation pressure (the amount of operation) of the operation device 180, and the controller (controller) 150 for controlling the solenoid proportional valve 7 on the basis of the operation pressure Po sensed by the pressure sensor 185A.

The controller 150 controls the solenoid proportional valve 7 such that in a case the operation pressure Po sensed by the pressure sensor 185A is in a range from the minimum operation pressure Pon to less than the second operation pressure Po2, the opening area A3 of the bypass cutoff valve 6 decreases until it reaches the minimum opening area A3 min according to the increase in the operation pressure Po. Accordingly, the energy loss of the main pump 1 is reduced for improved fuel economy. Moreover, satisfactory fine operability can be achieved.

The controller 150 controls the solenoid proportional valve 7 such that the opening area A3 of the bypass cutoff valve 6 becomes an opening area (predetermined opening area A30) larger than the minimum opening area A3 min in a case the operation pressure Po sensed by the pressure sensor 185A is the maximum operation pressure Pox. A surge pressure can thus be prevented from being generated when the boom cylinder (hydraulic actuator) 111A stops operating. As a result, the work performing efficiency of the hydraulic excavator 100 can be increased.

(2) The center bypass passage section 131 of the flow control valve 131 has such an opening characteristics A1*c* that the opening area A1 thereof decreases as the operation pressure Po increases and the center bypass passage section 131 is fully closed at the second operation pressure Po2 in a case the operation pressure Po is in a range less than the second operation pressure Po2. The controller 150 controls the solenoid proportional valve 7 such that the opening area A3 of the bypass cutoff valve 6 increases from the minimum opening area A3 min in a case the operation pressure Po sensed by the pressure sensor 185A is in a range of equal to or larger than the second operation pressure Po2 and equal to or less than the maximum operation pressure Pox. The energy loss can thus be made smaller than that if the opening area A3 of the bypass cutoff valve 6 increases from the minimum opening area A3 min when the operation pressure Po is less than the second operation pressure Po2. Note that a delay in opening the bypass cutoff valve 6 can effectively be prevented by setting the target opening area A3*t* for the bypass cutoff valve 6 at a time at which the operation pressure Po is the second operation pressure Po2 to the predetermined opening area A30.

Second Embodiment

Figure 9:
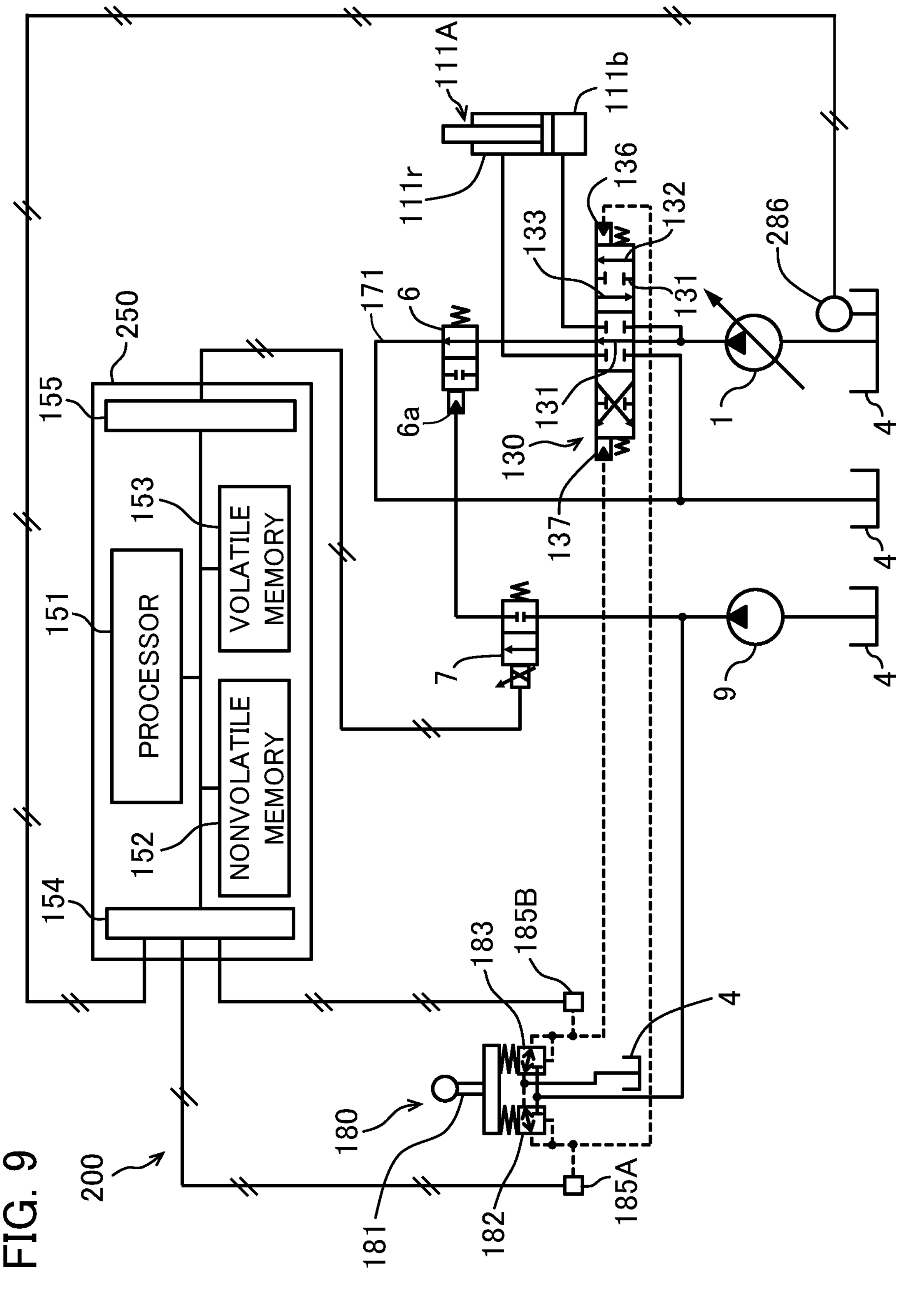
FIG. 9 is a diagram of a hydraulic system (hydraulic drive circuit) incorporated in a hydraulic excavator according to a second embodiment of the present invention.

A hydraulic excavator 200 according to a second embodiment of the present invention will be described below with reference to FIGS. 9 through 13. Note that, in FIGS. 9 through 13, those parts that are identical to or correspond to those of the first embodiment are denoted by identical reference characters, and the differences will mainly be described below. FIG. 9 is a diagram of a hydraulic system (hydraulic drive circuit) incorporated in the hydraulic excavator 200 according to the second embodiment. As illustrated in FIG. 9, the hydraulic excavator 200 according to the second embodiment includes, in addition to those parts similar to those of the hydraulic excavator 100 according to the first embodiment, a temperature sensor 286 for sensing the temperature of the hydraulic fluid that passes through the bypass cutoff valve 6.

According to the second embodiment, the temperature sensor 286 senses the temperature of the hydraulic fluid in the tank 4 that stores the hydraulic fluid to be drawn by the main pump 1. Note that the temperature sensor 286 may not necessarily be located in the tank 4.

Figure 10:
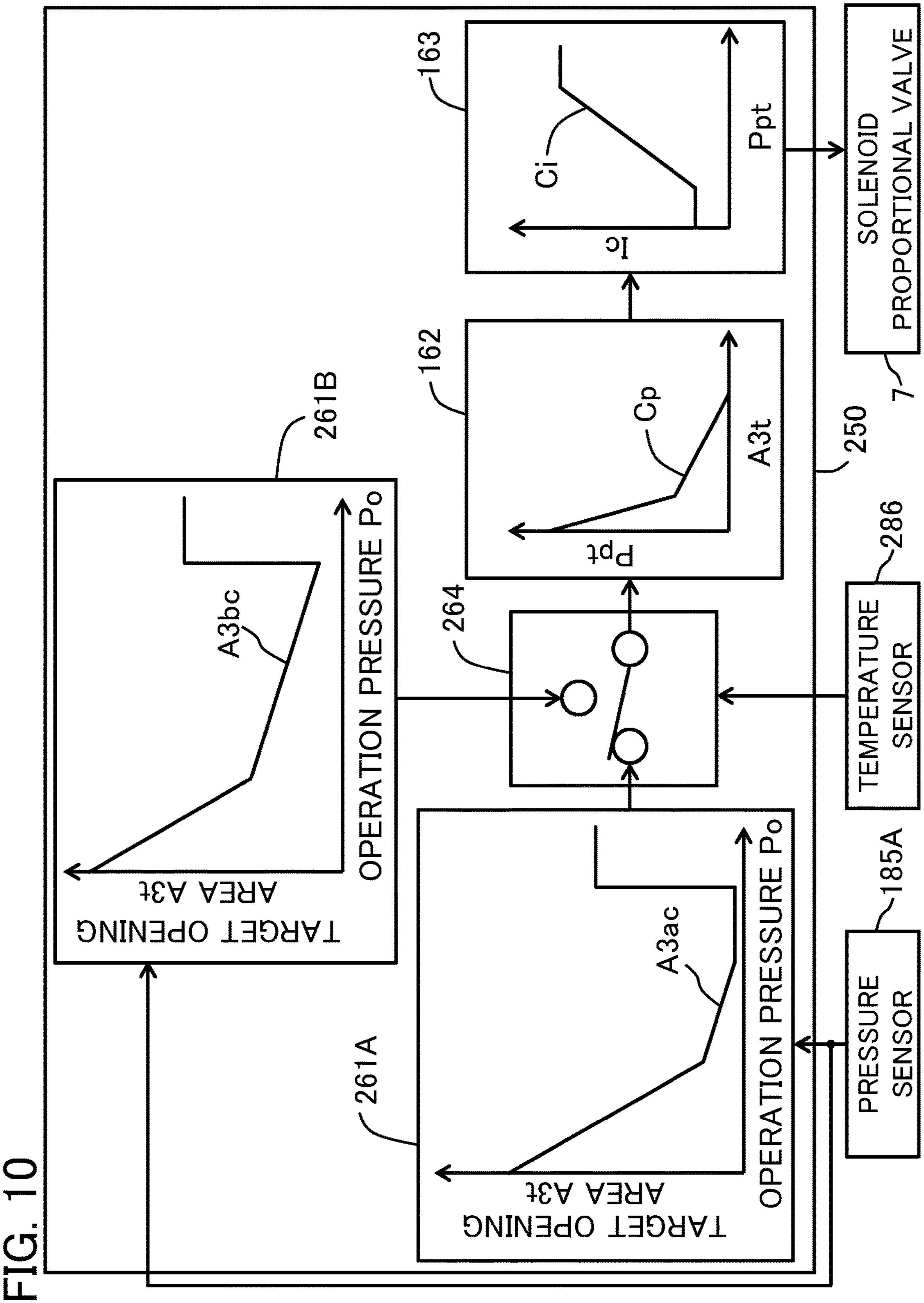
FIG. 10 is a block diagram representing a process of computing a control current value for a solenoid proportional valve, carried out by a controller of the hydraulic excavator according to the second embodiment.

FIG. 10, which is similar to FIG. 5, is a block diagram representing a process of computing a control current value for the solenoid proportional valve 7, carried out by a controller 250 of the hydraulic excavator 200 according to the second embodiment. As illustrated in FIG. 10, the controller 250 has a first opening area computing section 261A, a second opening area computing section 261B, a selector 264, a pilot pressure computing section 162, and a current computing section 163. The first opening area computing section 261A has the same function as the opening area computing section 161 described in the first embodiment. The first opening area computing section 261A refers to first target opening characteristics A3*ac* and computes a target opening area A3*t* for the bypass cutoff valve 6 on the basis of the operation pressure Po sensed by the pressure sensor 185A.

Figure 11:
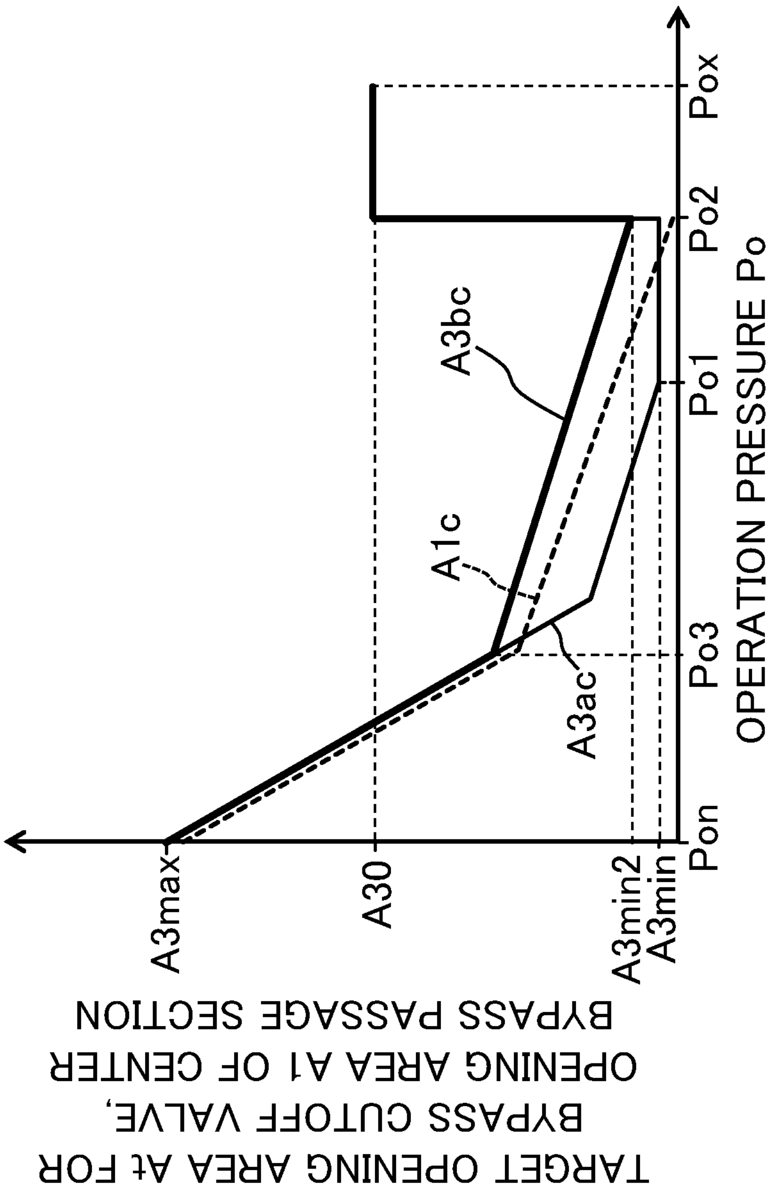
FIG. 11 is a diagram representing first target opening characteristics and second target opening characteristics of the bypass cutoff valve.

The second opening area computing section 261B refers to second target opening characteristics A3*bc* different from the first target opening characteristics A3*ac* and computes a target opening area A3*t* for the bypass cutoff valve 6 on the basis of the operation pressure Po sensed by the pressure sensor 185A. FIG. 11 is a diagram representing the first target opening characteristics A3*ac* and the second target opening characteristics A3*bc* of the bypass cutoff valve 6. The first target opening characteristics A3*ac* and the second target opening characteristics A3*bc* are stored in a table format in the nonvolatile memory 152. In FIG. 11, the first target opening characteristics A3*ac* are represented by a thinner solid-line curve and the second target opening characteristics A3*bc* by a thicker solid-line curve. Note that FIG. 11 also illustrates the opening characteristics A1*c* of the center bypass passage section 131 of the flow control valve 130 as a broken-line curve. The first target opening characteristics A3*ac* are identical to the target opening characteristics A3*tc* described in the first embodiment and will be omitted from description.

The relation between the operation pressure Po and the target opening area A3*t* according to the second target opening characteristics A3*bc* is as follows: When the operation pressure Po is the minimum operation pressure Pon, the target opening area A3*t* is the maximum opening area A3max. When the operation pressure Po is in a range from the minimum operation pressure Pon to less than the second operation pressure Po2, the target opening area A3*t* for the bypass cutoff valve 6 continuously decreases until it reaches a minimum opening area A3min2 as the operation pressure Po increases. Note that the minimum opening area A3min2 according to the second target opening characteristics A3*bc* is larger than the minimum opening area A3 min according to the first target opening characteristics A3*ac*.

When the operation pressure Po is equal to or higher than the second operation pressure Po2, the target opening area A3*t* for the bypass cutoff valve 6 becomes the predetermined opening area A30 that is larger than the minimum opening area A3min2. The rate of change (gradient) of the target opening area A3*t* with respect to the operation pressure Po in the range from the minimum operation pressure Pon to less than a third operation pressure Po3 and the rate of change (gradient) of the target opening area A3*t* with respect to the operation pressure Po in the range from the third operation pressure Po3 to less than the second operation pressure Po2 are different from each other. Note that the magnitudes of the operation pressures are related as follows: Pon<Po3<Po1<Po2<Pox.

When the operation pressure Po is in the range from the third operation pressure Po3 to less than the second operation pressure Po2, the target opening area A3*t* determined according to the second target opening characteristics A3*bc* is larger than the target opening area A3*t* determined according to the first target opening characteristics A3*ac*.

As illustrated in FIG. 10, the selector 264 determines whether or not the temperature T of the hydraulic fluid sensed by the temperature sensor 286 is equal to or higher than a threshold value TO. The threshold value TO is a threshold value for determining whether the hydraulic fluid is in a low-temperature state or not, and is stored in advance in the nonvolatile memory 152. The selector 264 selects the target opening area A3*t* computed by the first opening area computing section 261A if the selector 264 determines that the temperature T of the hydraulic fluid is equal to or higher than the threshold value TO, and outputs the selected target opening area A3*t* to the pilot pressure computing section 162. The selector 264 selects the target opening area A3*t* computed by the second opening area computing section 261B if the selector 264 determines that the temperature T of the hydraulic fluid is less than the threshold value TO, and outputs the selected target opening area A3*t* to the pilot pressure computing section 162. Note that the present invention is not limited to the selector 264, but a target opening area A3*t* may be selected from a three-dimensional table in response to an operation pressure and a hydraulic fluid temperature input thereto, for example.

The pilot pressure computing section 162 computes a target pilot pressure Ppt on the basis of the target opening area A3*t* selected by the selector 264. The current computing section 163 computes a control current value Ic on the basis of the target pilot pressure Ppt computed by the pilot pressure computing section 162, and outputs a control current according to the computed control current value Ic to the solenoid proportional valve 7.

Major operation of the second embodiment will be described below. A crane work (load suspending work) carried out by the hydraulic excavator 200 will be described below by way of example. When the operator operates the operation lever 181 in the boom raising direction, the boom cylinder 111A is extended to turn the boom 111 upwardly. When the operator gradually increases the amount of operation of the operation lever 181 (finely operates the operation lever 181), the load is smoothly lifted by the work implement 104.

Here, the hydraulic excavator 100 according to the first embodiment may possibly be unable to operate the boom cylinder 111A smoothly owing to an increased pressure loss of the hydraulic fluid passing through the center bypass passage section 131 of the flow control valve 130 and the bypass cutoff valve 6 if the temperature T of the hydraulic fluid is low.

In contrast, according to the second embodiment, in a case the temperature T of the hydraulic fluid sensed by the temperature sensor 286 is lower (T<T0), the controller 150 controls the solenoid proportional valve 7 to make the opening area A3 of the bypass cutoff valve 6 larger than in a case the temperature T of the hydraulic fluid sensed by the temperature sensor 286 is higher (T≥T0).

When the operator operates the operation lever 181 in the boom raising direction, for example, the boom cylinder 111A can thus be operated smoothly without causing shocks. The ability of the configuration according to the second embodiment to be able to operate the boom cylinder 111A without causing shocks when the operation lever 181 is operated to raise the boom 111 will be described below in comparison with the first embodiment.

Figure 12:
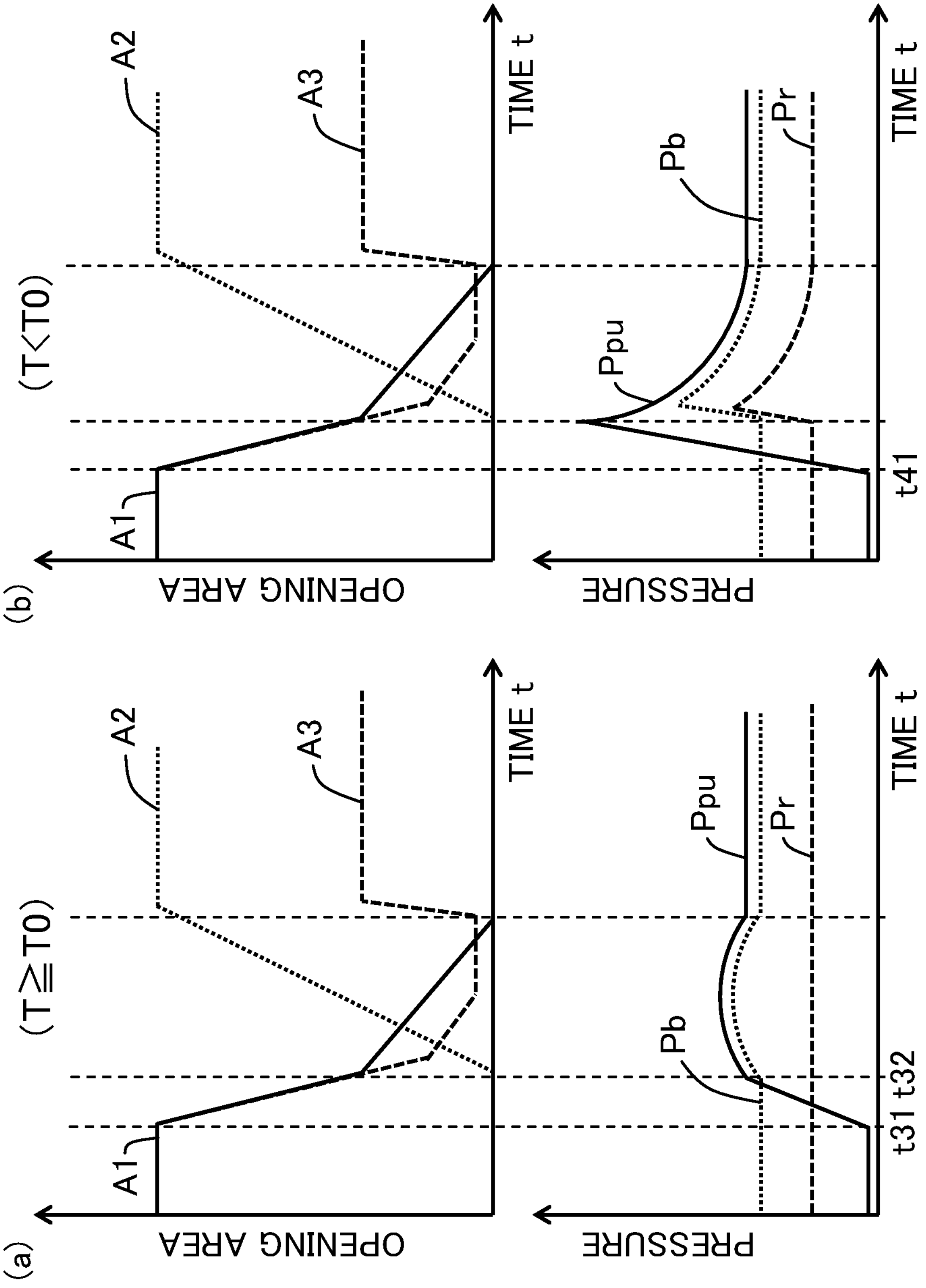
Figure 13:
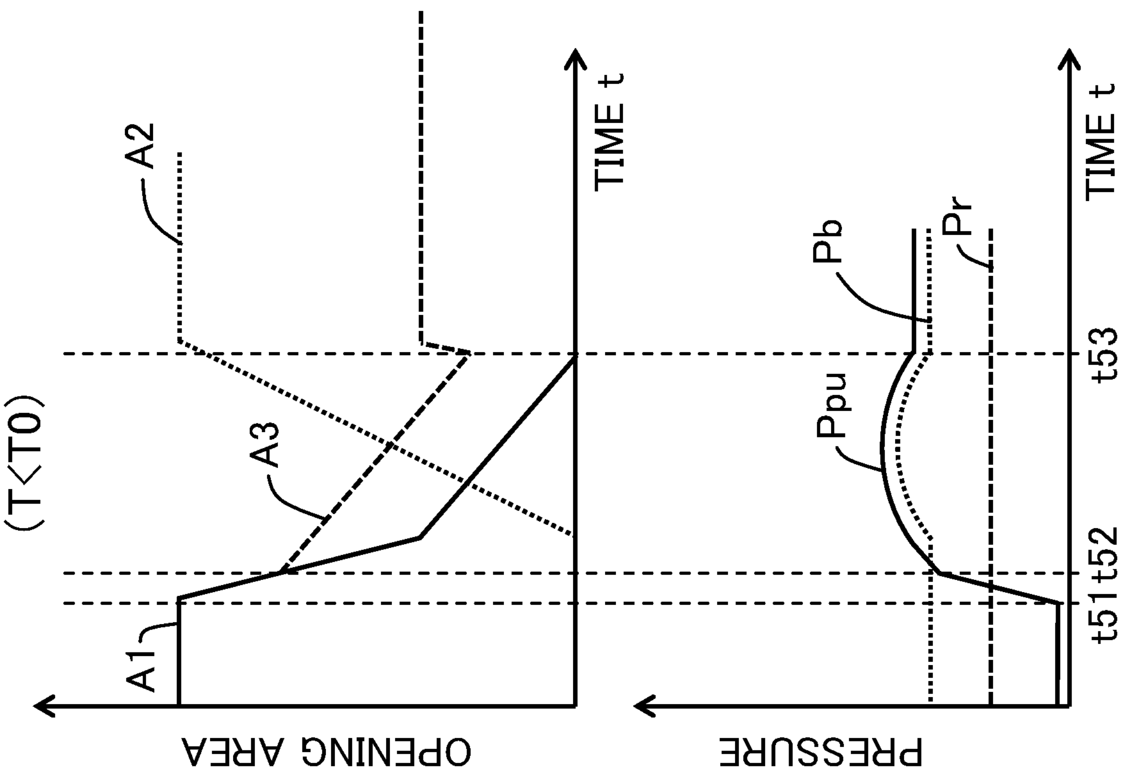
FIG. 13 is a set of timing charts representing time-depending changes in an opening area of each valve and a pressure of a hydraulic fluid at a time at which an operation is performed to raise a boom of the hydraulic excavator according to the second embodiment.

FIG. 12 is a set of timing charts representing time-depending changes in the opening area of each valve and the pressure of the hydraulic fluid at a time at which an operation is performed to raise the boom of the hydraulic excavator 100 according to the first embodiment. FIG. 12 illustrates at (a) timing charts when the temperature T of the hydraulic fluid is equal to or higher than the threshold value TO, and FIG. 12 illustrates at (b) timing charts when the temperature T of the hydraulic fluid is less than the threshold value TO. FIG. 13 is a set of timing charts representing time-depending changes in the opening area of each valve and the pressure of a hydraulic fluid at a time at which an operation is performed to raise the boom of the hydraulic excavator 200 according to the second embodiment. The timing charts illustrated in FIG. 12 at (a) and (b) and FIG. 13 are timing charts at a time at which the operation lever 181 is operated from the neutral position in the boom raising direction. Note that the upper timing charts representing the changes in the opening area illustrate the time-dependent changes in the opening area A1 of the center bypass passage section 131 of the flow control valve 130, the opening area A2 of the meter-in passage section 132, and the opening area A3 of the bypass cutoff valve 6. Also, the lower timing charts representing the changes in the pressure illustrate the time-dependent changes in the pump pressure Ppu, the bottom pressure Pb of the boom cylinder 111A, and the rod pressure Pr of the boom cylinder 111A.

As illustrated in FIG. 12 at (a), according to the first embodiment, if the temperature T of the hydraulic fluid is equal to or higher than the predetermined temperature TO, then when the operator starts to operate the operation lever 181 from the neutral position in the boom raising direction (at point T31 of time), the flow control valve 130 is displaced from the neutral position. Therefore, the opening area A1 of the center bypass passage section 131 and the opening area A3 of the bypass cutoff valve 6 start to gradually decrease from point t31 of time. Furthermore, the meter-in passage section 132 starts to open from point t32 of time, and the opening area A2 of the meter-in passage section 132 increases as the amount of operation increases.

If the temperature T of the hydraulic fluid is equal to or higher than the predetermined temperature TO, then the pump pressure Ppu gradually rises from point t31 of time. The pump pressure Ppu exceeds the bottom pressure Pb immediately prior to point t32 of time when the meter-in passage section 132 starts to open. By thus matching the pump pressure Ppu to the bottom pressure Pb at a time at which the meter-in passage section 132 starts to open, it is possible to start to operate the boom cylinder 111A smoothly. Consequently, the boom 111 is operated slowly to lift the load.

However, as illustrated in FIG. 12 at (a), if the temperature T of the hydraulic fluid becomes lower than the predetermined temperature TO, then since the viscosity (degree of viscosity) of the hydraulic fluid increases, the pressure loss caused when the hydraulic fluid passes through the center bypass passage section 131 of the flow control valve 130 and the bypass cutoff valve 6 becomes larger. Consequently, the pump pressure Ppu rises abruptly from point t41 of time when an operation is performed to start to operate the operation lever 181 from the neutral position in the boom raising direction. In other words, the rate of increase of the pump pressure Ppu becomes larger than if the temperature T of the hydraulic fluid is higher (T≥T0). As a consequence, if the temperature T of the hydraulic fluid is lower than the predetermined temperature TO, when the boom 111 is to be raised, the pressure (i.e., the bottom pressure Pb) of the hydraulic fluid flowing into the bottom-side fluid chamber 111*b* of the boom cylinder 111A becomes unnecessarily higher than if the temperature T of the hydraulic fluid is higher than the predetermined temperature T0. As a result, shocks are likely to occur due to the boom cylinder 111A operating abruptly. If the temperature T of the hydraulic fluid is lower, therefore, the fine operability deteriorates, making it difficult to position the work implement 104. Also, if the work implement 104 starts to operate abruptly (if shocks are caused when the work implement 104 starts to operate), the operator is liable to experience increased fatigue. Consequently, the quick operation of the work implement 104 is liable to invite a reduction in the work performing efficiency of the hydraulic excavator 100.

In contrast, according to the second embodiment, as described above, if the temperature T of the hydraulic fluid is less than the threshold value T0, the controller 250 controls the solenoid proportional valve 7 to make the opening area A3 of the bypass cutoff valve 6 larger than if the temperature T of the hydraulic fluid is equal to or higher than the threshold value T0. According to the second embodiment, consequently, as illustrated in FIG. 13, the opening area A1 of the center bypass passage section 131 and the opening area A3 of the bypass cutoff valve 6 are reduced from point t51 of time when the operation lever 181 starts to operate in the boom raising direction from the neutral position. At point t52 of time, the rate of reduction of the opening area A3 of the bypass cutoff valve 6 is reduced. Point t52 of time is prior to the point of time when the meter-in passage section 132 starts to open. From time t52 of time to point t53 of time when the center bypass passage section 131 is fully closed, the opening area A3 of the bypass cutoff valve 6 at a time at which the temperature T of the hydraulic fluid is less than the threshold value T0 is larger than the opening area A3 at a time at which the temperature T of the hydraulic fluid is equal to or higher than the threshold value T0. Accordingly, since the pressure loss caused when the hydraulic fluid passes through the center bypass passage section 131 of the flow control valve 130 and the bypass cutoff valve 6 drops, the pump pressure Ppu is prevented from rising abruptly. As a result, the bottom pressure Pb is also prevented from rising abruptly.

According to the second embodiment, as described above, as the work implement 104 is prevented from starting to operate abruptly if the temperature of the hydraulic fluid is lower, it is possible to position the work implement 104 easily. According to the second embodiment, moreover, since the work implement 104 can be prevented from starting to operate abruptly if the temperature of the hydraulic fluid is lower, it is possible to reduce the fatigue of the operator. As a result, the work performing efficiency of the hydraulic excavator 200 can be increased.

Third Embodiment

Figure 14:
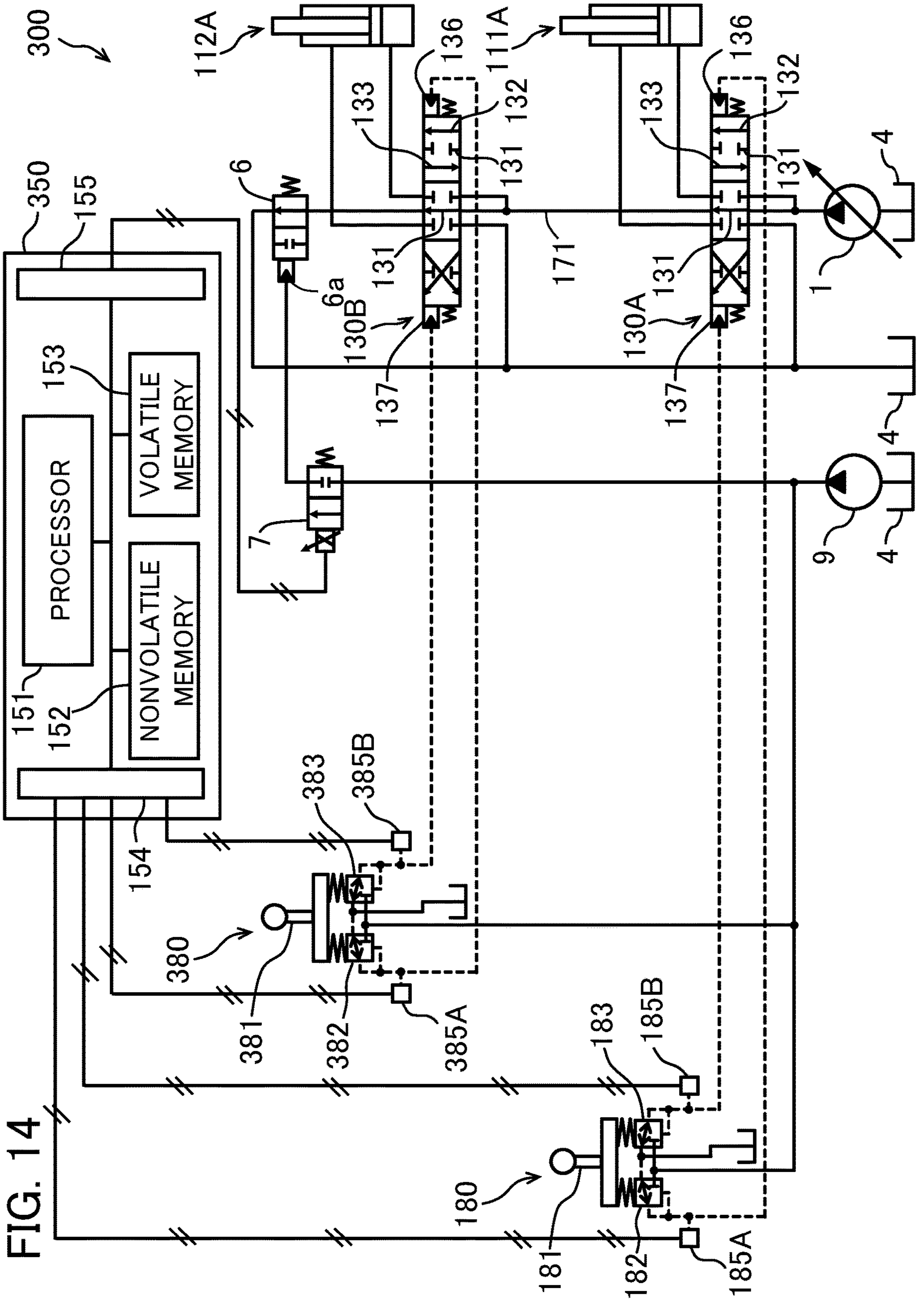
FIG. 14 is a diagram of a hydraulic system (hydraulic drive circuit) incorporated in a hydraulic excavator according to a third embodiment of the present invention.

A hydraulic excavator 300 according to a third embodiment of the present invention will be described below with reference to FIGS. 14 and 15. Note that, in FIGS. 14 and 15, those parts that are identical to or correspond to those according to the second embodiment are denoted by identical reference characters, and the differences will mainly be described below. FIG. 14, which is similar to FIGS. 2 and 9, is a diagram of a hydraulic system (hydraulic drive circuit) incorporated in the hydraulic excavator 300 according to the third embodiment.

As illustrated in FIG. 14, the hydraulic excavator 300 according to the third embodiment includes a plurality of flow control valves 130A and 130B provided to the center bypass line 171. The flow control valve 130A and the flow control valve 130B that are connected in tandem are similar in structure to the flow control valve 130 described in the first embodiment. The flow control valve 130A controls the direction of flow and flow rate of the hydraulic fluid supplied to the boom cylinder 111A. The flow control valve 130B controls the direction of flow and flow rate of the hydraulic fluid supplied to the arm cylinder 112A.

The hydraulic excavator 300 includes an operation device 380 for operating the arm cylinder 112A and pressure sensors 385A and 385B for sensing pilot pressures acting on respective pilot bearing members 136 and 137 of the flow control valve 130B.

The operation device 380 is an operation device for operating the arm 112 (the arm cylinder 112A and the flow control valve 130B) and has an operation lever 381 as an operation member and an arm-crowding pilot valve 382 and an arm-dumping pilot valve 383 for generating pilot pressures (operation pressures) for controlling the flow control valve 130B on the basis of the degree to which the operation lever 381 is operated. The operation device 380 is a hydraulic-pilot-type operation device for directly supplying the flow control valve 130B with pilot pressures (operation pressures) generated by the pilot valves 382 and 383 according to the direction in which and the degree to which the operation lever 381 is operated. The operation lever 381 is provided on the left side of the operator's seat in the cabin 118 (see FIG. 1), for example, and is operated selectively leftwardly and rightwardly. When the operation lever 381 is operated leftwardly, the arm 112 makes an arm dumping operation. The arm dumping operation includes a turn of the arm 112 for moving the distal end of the arm 112 away from the machine body 105. When the operation lever 381 is operated rightwardly, the arm 112 makes an arm crowding operation. The arm crowding operation includes a turn of the arm 112 for moving the distal end of the arm 112 toward the machine body 105.

The pressure sensor 385A senses the operation pressure Po output from the arm-crowding pilot valve 382 when an arm crowding operation is carried out by the operation lever 381, and outputs the sensed pressure to a controller 350. The pressure sensor 385B senses the operation pressure Po output from the arm-dumping pilot valve 383 when an arm dumping operation is carried out by the operation lever 381, and outputs the sensed pressure to the controller 350.

When the operation lever 181 and the operation lever 381 perform a combined operation on the flow control valves 130A and 130B, the opening area (composite opening area) of the center bypass line 171 is made smaller than if the operation lever 181 or the operation lever 381 performs an individual operation on the flow control valve 130A or 130B. Therefore, the fluid pressure of the boom cylinder 111A that is supplied with the hydraulic fluid from the flow control valve 130A that is disposed upstream in the center bypass line 171, of the flow control valve 130A and the flow control valve 130B that are connected in tandem, becomes unnecessarily high. Consequently, as with the situation described in the second embodiment in which the temperature of the hydraulic fluid is in a low-temperature state, shocks are likely to occur when the boom cylinder 111A starts to operate.

According to the third embodiment, the controller 350 controls the solenoid proportional valve 7 to make the opening area A3 of the bypass cutoff valve 6 larger than in a case an individual operation is performed on the flow control valve 130A or 130B, in a case a combined operation is performed on the flow control valves 130A and 130B.

Figure 15:
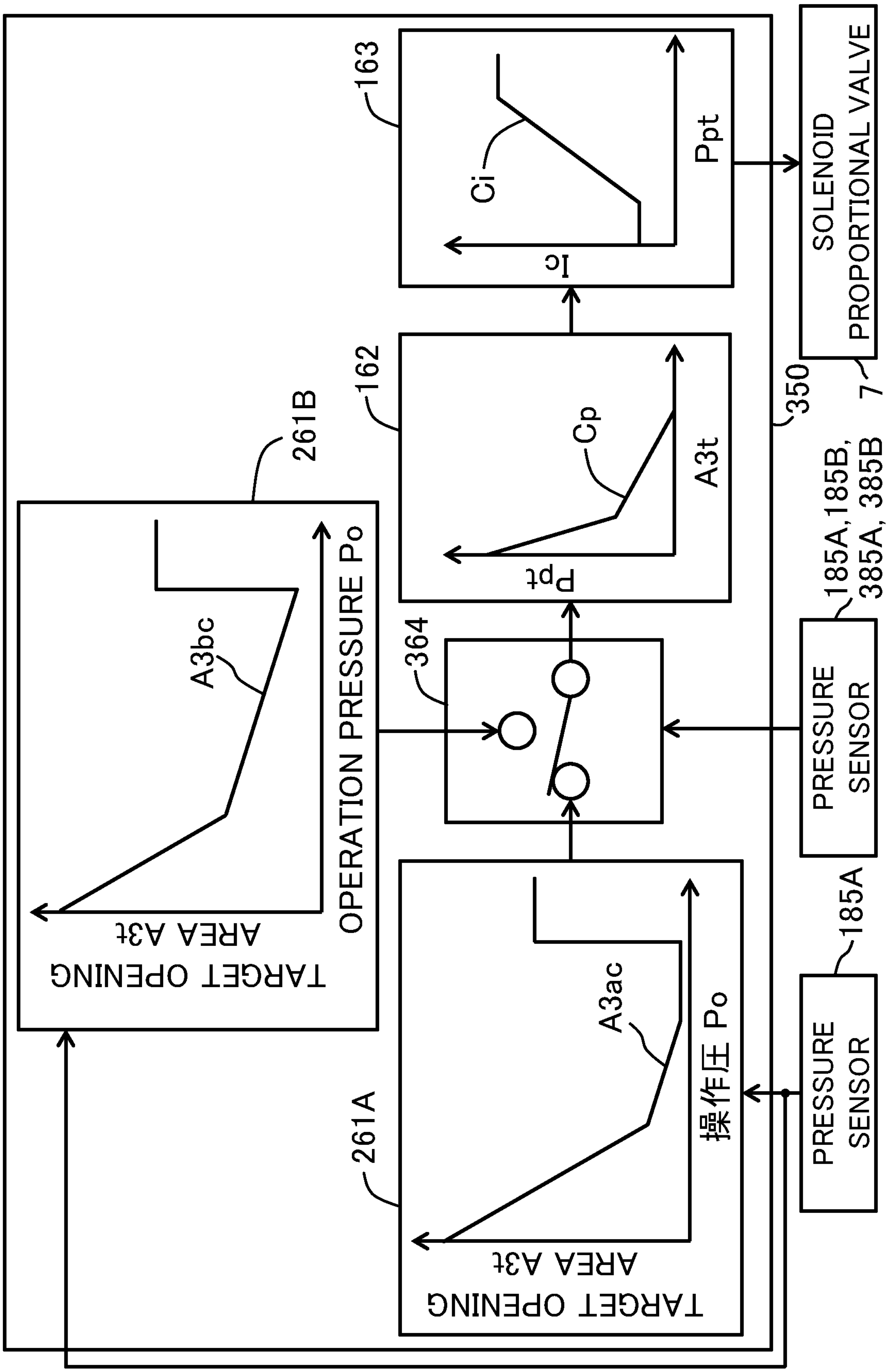
FIG. 15 is a block diagram representing a process of computing a control current value for a solenoid proportional valve, carried out by a controller of the hydraulic excavator according to the third embodiment.

FIG. 15, which is similar to FIGS. 5 and 10, is a block diagram representing a process of computing a control current value for the solenoid proportional valve 7, carried out by the controller 350 of the hydraulic excavator 300 according to the third embodiment. As illustrated in FIG. 15, the controller 350 has a selector 364 in place of the selector 264 described in the second embodiment. The selector 364 determines whether the flow control valve 130A and the flow control valve 130B are simultaneously operated in a combined operation state or not on the basis of the operation pressures Po sensed by the pressure sensors 185A, 185B, 385A, and 385B.

The selector 364 determines the combined operation state, if either one of the operation pressures Po sensed by the pressure sensors 185A and 185B is equal to or higher than a threshold value Po0 and either one of the operation pressures sensed by the pressure sensors 385A and 385B is equal to or higher than the threshold value Po0. Otherwise, the selector 364 determines no combined operation state. The threshold value Po0 is a threshold value used in determining whether the operation devices 180 and 380 are operated or not. The threshold value Po0 is stored in advance in the nonvolatile memory 152. The selector 364 selects the target opening area A3*t* computed by the first opening area computing section 261A, if the selector 364 determines no combined operation state (i.e., an individual operation state), and outputs the selected target opening area A3*t* to the pilot pressure computing section 162. The selector 364 selects the target opening area A3*t* computed by the second opening area computing section 261B, if the selector 364 determines the combined operation state, and outputs the selected target opening area A3*t* to the pilot pressure computing section 162. Note that the present invention is not limited to the selector 364, but a target opening area A3*t* may be selected from a three-dimensional table in response to an operation pressure output from the operation device 180 and input thereto and an operation pressure output from the operation device 380 and input thereto, for example.

According to the third embodiment, as described above, the plurality of flow control valves 130A and 130B are provided to the center bypass line 171. The controller 350 controls the solenoid proportional valve 7 to make the opening area A3 of the bypass cutoff valve 6 larger than when the flow control valve 130A or the flow control valve 130B is individually operated in the individual operation state, when the plurality of flow control valves 130A and 130B are operated in the combined operation state.

According to the third embodiment, consequently, the work implement 104 can be prevented from starting to operate abruptly when the plurality of flow control valves 130A and 130B are operated in the combined operation state, and hence, the work implement 104 can easily be positioned. According to the third embodiment, furthermore, when the plurality of flow control valves 130A and 130B are operated in the combined operation state, since the work implement 104 can be prevented from starting to operate abruptly, it is possible to reduce the fatigue of the operator. As a result, the work performing efficiency of the hydraulic excavator 300 can be increased.

Modifications to be described below fall within the scope of the present invention. It is possible to combine the configurations according to the modifications and the configurations according to the above embodiments with each other, combine the configurations according to the above different embodiments with each other, and combine the configurations to be described in the following different modifications.

<Modification 1>

According to the first embodiment described above, when the operation pressure Po sensed by the pressure sensor 185A is the second operation pressure Po2, the controller 150 controls the solenoid proportional valve 7 to increase the opening area A3 of the bypass cutoff valve 6 from the minimum opening area A3 min. However, the present invention is not limited such a feature.

<Modification 1-1>

The controller 150 may control the solenoid proportional valve 7 to increase the opening area A3 of the bypass cutoff valve 6 from the minimum opening area A3 min when the operation pressure Po is higher than the second operation pressure Po2. As described above, the controller 150 can reduce the energy loss by controlling the solenoid proportional valve 7 to increase the opening area A3 of the bypass cutoff valve 6 from the minimum opening area A3 min when the operation pressure Po is in the range from the second operation pressure Po2 to the maximum operation pressure Pox.

<Modification 1-2>

The controller 150 may control the solenoid proportional valve 7 to increase the opening area A3 of the bypass cutoff valve 6 from the minimum opening area A3 min when the operation pressure Po is less than the second operation pressure Po2. Note that the lower the operation pressure Po is at a time at which the opening area A3 of the bypass cutoff valve 6 increases from the minimum opening area A3 min, the more the energy loss is caused. Therefore, it is preferable for the operation pressure Po to be higher (i.e., closer to the second operation pressure Po2) at a time at which the opening area A3 of the bypass cutoff valve 6 increases from the minimum opening area A3 min.

<Modification 2>

According to the first embodiment described above, the operation device 180 has been described as a hydraulic-pilot-type operation device by way of example. However, the present invention is not limited to such a feature. The operation device 180 may be an electric operation device. The amount of operation of the electric operation device is sensed by an amount-of-operation sensor such as a potentiometer for sensing a rotational angle of the operation lever. The controller 150 outputs a control current to a solenoid proportional valve (pilot valve) on the basis of the amount of operation sensed by the amount-of-operation sensor. The solenoid proportional valve (pilot valve) reduces the pilot primary pressure supplied from the pilot pump 9 to generate pilot pressures (operation pressures) and outputs the generated pilot pressures (operation pressures) to the pilot bearing members 136 and 137 of the flow control valve 130. With such a configuration, the solenoid proportional valve 7 that controls the bypass cutoff valve 6 and the solenoid proportional valve (pilot valve) that controls the flow control valve 130 are controlled by the controller 150, and their responses are less likely to differ from each other. However, the bypass cutoff valve 6 may lag in operation behind the flow control valve 130 due to the difference between the lengths of a pilot line interconnecting the pilot bearing member 136 of the flow control valve 130 and the solenoid proportional valve (pilot valve) and a pilot line interconnecting the bypass cutoff valve 6 and the solenoid proportional valve 7, valve characteristics differences, and the like. Therefore, a hydraulic excavator having an electric operation device can offer the same advantages as those described in the above embodiments.

<Modification 3>

According to the first embodiment described above, the configuration for preventing a surge pressure from being generated in the boom cylinder 111A has been described. However, the present invention is not limited to such a feature. According to the present invention, a surge pressure can similarly be prevented from being generated in the arm cylinder 112A and the bucket cylinder 113A.

<Modification 4>

According to the embodiment described above, the work machine has been described as the crawler-type hydraulic excavator 100. However, the present invention is not limited to such a feature. The present invention is also applicable to various work machines including a wheel-type hydraulic excavator, a wheel loader, and the like.

The embodiments of the present invention have been described above. The embodiments described above merely represent some of the applications of the present invention, and should not be construed as limiting the technical scope of the invention to the specific details of the embodiments.

DESCRIPTION OF REFERENCE CHARACTERS

1: Main pump
4: Tank
6: Bypass cutoff valve

7: Solenoid proportional valve
9: Pilot pump
100: Hydraulic excavator (work machine)
111A: Boom cylinder (hydraulic actuator)
112A: Arm cylinder (hydraulic actuator)
113A: Bucket cylinder (hydraulic actuator)
130: Flow control valve
130A: Flow control valve
130B: Flow control valve
131: Center bypass passage section
132: Meter-in passage section
133: Meter-out passage section
150: Controller (controlling device)
161: Opening area computing section
162: Pilot pressure computing section
163: Current computing section
171: Center bypass line
180: Operation device
181: Operation lever (operation member)
182, 183: Pilot valve
185A, 185B: Pressure sensor (amount-of-operation sensor)
200: Hydraulic excavator (work machine)
250: Controller (controlling device)
261A: First opening area computing section
261B: Second opening area computing section
264: Selector
286: Temperature sensor
300: Hydraulic excavator (work machine)
350: Controller (controlling device)
364: Selector
380: Operation device
381: Operation lever (operation member)
382, 383: Pilot valve
385A, 385B: Pressure sensor (amount-of-operation sensor)
A1: Opening area of center bypass passage section
A1*c*: Opening characteristics of center bypass passage section
A2: Opening area of meter-in passage section
A2*c*: Opening characteristics of meter-in passage section
A3: Opening area of bypass cutoff valve
A3*ac*: First target opening characteristics of bypass cutoff valve
A3*bc*: Second target opening characteristics of bypass cutoff valve
A3*tc*: Target opening characteristics for bypass cutoff valve

The invention claimed is:

1. A work machine comprising:

a pump that delivers a hydraulic fluid sucked from a tank;

a hydraulic actuator that is driven by the hydraulic fluid delivered from the pump;

a flow control valve having a center bypass passage section that introduces the hydraulic fluid from the pump into the tank when the flow control valve is in a neutral position and controlling a flow rate of the hydraulic fluid supplied to the hydraulic actuator according to an amount of displacement thereof from the neutral position;

a center bypass line that introduces the hydraulic fluid supplied from the pump through the center bypass passage section of the flow control valve into the tank;

a bypass cutoff valve that is provided downstream of the flow control valve in the center bypass line and that controls an opening of the center bypass line;

a solenoid proportional valve that generates a pilot pressure for controlling the bypass cutoff valve;

an operation device that operates the hydraulic actuator;

a pilot valve that generates a pilot pressure for controlling the flow control valve on a basis of an amount of operation of the operation device;

an amount-of-operation sensor that senses the amount of operation of the operation device; and a controller that controls the solenoid proportional valve on a basis of the amount of operation sensed by the amount-of-operation sensor, wherein the controller controls the solenoid proportional valve to reduce an opening area of the bypass cutoff valve to a minimum opening area according to an increase in the amount of operation in a case the amount of operation sensed by the amount-of-operation sensor is in a range from a minimum amount of operation to less than a predetermined amount of operation, and the controller controls the solenoid proportional valve to make the opening area of the bypass cutoff valve larger than the minimum opening area in a case the amount of operation sensed by the amount-of-operation sensor is a maximum amount of operation.

2. The work machine according to claim 1, wherein the center bypass passage section of the flow control valve has such opening characteristics that an opening area of the center bypass passage section becomes smaller as the amount of operation increases in a case the amount of operation is in a range less than the predetermined amount of operation and the center bypass passage section is fully closed at the predetermined amount of operation, and the controller controls the solenoid proportional valve to increase the opening area of the bypass cutoff valve from the minimum opening area in a case the amount of operation sensed by the amount-of-operation sensor is in a range of equal to or larger than the predetermined amount of operation and equal to or less than the maximum amount of operation.

3. The work machine according to claim 1, further comprising:

a temperature sensor that senses a temperature of the hydraulic fluid passing through the bypass cutoff valve, wherein the controller controls the solenoid proportional valve to make the opening area of the bypass cutoff valve larger in a case the temperature of the hydraulic fluid sensed by the temperature sensor is lower than in a case the temperature of the hydraulic fluid sensed by the temperature sensor is high.

4. The work machine according to claim 1, wherein a plurality of the flow control valves are provided to the center bypass line, and the controller controls the solenoid proportional valve to make the opening area of the bypass cutoff valve larger in a case the plurality of the flow control valves are operated in a combined operation state than in a case each of the flow control valves is individually operated.

* * * * *